United States Patent
Motodani et al.

(10) Patent No.: US 11,662,116 B2
(45) Date of Patent: May 30, 2023

(54) VENTILATOR

(71) Applicant: Mitsubishi Electric Corporation, Chiyoda-ku (JP)

(72) Inventors: Mio Motodani, Tokyo (JP); Hiroyuki Waku, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 534 days.

(21) Appl. No.: 16/649,408

(22) PCT Filed: Sep. 11, 2018

(86) PCT No.: PCT/JP2018/033664
§ 371 (c)(1),
(2) Date: Mar. 20, 2020

(87) PCT Pub. No.: WO2019/082531
PCT Pub. Date: May 2, 2019

(65) Prior Publication Data
US 2020/0263895 A1     Aug. 20, 2020

(30) Foreign Application Priority Data
Oct. 24, 2017   (JP) .............................. JP2017-205323

(51) Int. Cl.
*F24F 11/74*     (2018.01)
*F24F 11/88*     (2018.01)
(Continued)

(52) U.S. Cl.
CPC .............. *F24F 11/74* (2018.01); *F24F 3/147* (2013.01); *F24F 7/007* (2013.01); *F24F 11/88* (2018.01);
(Continued)

(58) Field of Classification Search
CPC .. F24F 11/74; F24F 11/88; F24F 3/147; F24F 7/007; F24F 2110/12; F24F 2110/20; F24F 2130/10; F24F 2140/10
See application file for complete search history.

(56) References Cited

U.S. PATENT DOCUMENTS

| | | | |
|---|---|---|---|
| 2004/0096719 | A1 | 5/2004 | Singh et al. |
| 2007/0136037 | A1 | 6/2007 | Holzl |

(Continued)

FOREIGN PATENT DOCUMENTS

| | | | |
|---|---|---|---|
| EP | 3165845 | A1 | 5/2017 |
| JP | H04-283333 | A | 10/1992 |

(Continued)

OTHER PUBLICATIONS

Office Action dated Nov. 23, 2020, in corresponding German patent Application No. 112018005045.9, 6 pages.

(Continued)

*Primary Examiner* — Marc E Norman
(74) *Attorney, Agent, or Firm* — Xsensus LLP

(57) ABSTRACT

A ventilator (1) includes: an air supply fan (2) to supply outdoor air to a room; an air exhaust fan (3) to exhaust indoor air, out of the room; and a total heat exchanger (4) which is made with partition boards (41) being moisture-permeable flat parts and with spacer boards (42) being corrugated parts, the partition boards and the spacer boards being alternately stacked, the total heat exchanger exchanging heat between the outdoor air and the indoor air; and thereby suppresses ice formation. The ventilator (1) includes: an indoor temperature sensor (7); an indoor humidity sensor (8); an outdoor temperature sensor (6); and a control unit (5) to control operation of the air supply fan (2) and the air exhaust fan (3) on a basis of at least one state quantity estimated by substituting the indoor air temperature, the indoor air humidity, and the outdoor air temperature (Continued)

in a total heat exchanger model formula (51*a*) representing characteristics of the total heat exchanger (4).

17 Claims, 23 Drawing Sheets

(51) Int. Cl.
*F24F 7/00* (2021.01)
*F24F 3/14* (2006.01)
*F24F 7/007* (2006.01)
*F24F 3/147* (2006.01)
*F24F 110/20* (2018.01)
*F24F 130/10* (2018.01)
*F24F 140/10* (2018.01)
*F24F 110/12* (2018.01)
*F24F 140/12* (2018.01)

(52) U.S. Cl.
CPC ....... *F24F 2110/12* (2018.01); *F24F 2110/20* (2018.01); *F24F 2130/10* (2018.01); *F24F 2140/10* (2018.01); *F24F 2140/12* (2018.01)

(56) References Cited

U.S. PATENT DOCUMENTS

| | | | | |
|---|---|---|---|---|
| 2010/0191379 A1* | 7/2010 | Takeuchi | ................. | F24F 8/10 |
| | | | | 700/276 |
| 2012/0216571 A1* | 8/2012 | Sakamoto | ............... | C03C 3/078 |
| | | | | 65/347 |
| 2017/0108231 A1 | 4/2017 | Hasegawa et al. | | |
| 2017/0159963 A1* | 6/2017 | Matsugi | ................... | F24F 11/70 |
| 2017/0234571 A1* | 8/2017 | Iio | ........................... | F24F 13/22 |
| | | | | 165/247 |

FOREIGN PATENT DOCUMENTS

| | | |
|---|---|---|
| JP | 2003-148780 A | 5/2003 |
| JP | 2006-329584 A | 12/2006 |
| JP | 2007-163131 A | 6/2007 |
| JP | 2008-151458 A | 7/2008 |
| JP | 2013-20925 A | 1/2013 |
| JP | 2013-204899 A | 10/2013 |
| JP | 2015-94530 A | 5/2015 |
| JP | 2015-143593 A | 8/2015 |
| WO | WO 2010/102627 A1 | 9/2010 |

OTHER PUBLICATIONS

Notice of Reasons for Refusal dated Oct. 1, 2019 in Japanese Patent Application No. PCT/JP2018/033664 filed Sep. 11, 2018.
International Search Report dated Nov. 6, 2018 in PCT/JP2018/033664 filed Sep. 11, 2018, 2 pages.

\* cited by examiner

VENTILATOR

TECHNICAL FIELD

The present invention relates to a ventilator for ventilating a room.

BACKGROUND ART

A ventilator is conventionally known that exhausts, in order to keep the indoor environment comfortable, indoor air outside of the building while exchanging heat between indoor air and the air taken from outside the building. For example, Patent Document 1 discloses a ventilator including a total heat exchanger that exchanges total energy between the outdoor air flowing through a supply passage and the indoor air flowing through an exhaust passage. The ventilator according to Patent Document 1 includes a control unit which detects a moisture index of the indoor air from an indoor temperature sensor and an indoor humidity sensor; in a case where the outdoor air temperature falls below a threshold, the control unit controls to extend an air supply fan's stoppage duration in the intermittent operation period according to the moisture index and the outdoor temperature. This makes it possible to suppress ice formation in the total heat exchanger, which occurs when the outdoor air temperature is low and the indoor air humidity is high.

Patent Document 2 discloses a heat exchange unit that includes, similarly to Patent Document 1, a total heat exchanger; in a case where the outdoor temperature is below a first level, the heat exchange unit performs a first ice-formation-suppression control; and in a case where the outdoor temperature is below a second level that is lower than the first level, the heat exchange unit performs a second ice-formation-suppression control. In the second ice-formation-suppression control, the air supply fan's stoppage duration in the intermittent operation period is longer than that in the first ice-formation-suppression control. This makes it possible to suppress ice formation in a total heat exchanger even in a cold district where the outdoor temperature falls to −15 degrees C. or to −20 degrees C.

PRIOR ART DOCUMENTS

Patent Documents

Patent Document 1; Unexamined Patent Application Publication JP, 2015-143593, A

Patent Document 2: Unexamined Patent Application Publication JP, 2003-148780, A

SUMMARY OF THE INVENTION

Problems to be Solved by the Invention

The conventional ventilator disclosed in Patent Document 1 does not take into account the volume of ice formed in the total heat exchanger, uses fixed threshold values for outdoor temperature levels and moisture index levels, and uses the air supply fan's stoppage durations fixed corresponding to the levels. This causes a problem that the air supply fan continues stopping even after the formed ice entirely melts, and a problem that the air supply fan comes to operate before completing melting all the formed ice, resulting an increase in ice formation. Also, the conventional heat exchange unit disclosed in Patent Document 2 stops the air supply fan at an intermittent operation cycle predetermined according to outdoor temperature, which leads to the same problem as in Patent Document 1.

In view of the problems described above, the present invention is devised to obtain a ventilator provided with a control unit that determines an operation state of the air supply fan according to the ice formation volume in its total heat exchanger to suppress the ice formation in the total heat exchanger.

Solution to Problems

A ventilator according to the present invention includes: an air supply fan to supply outdoor air to a room; an air exhaust fan to exhaust indoor air, out of the room; a total heat exchanger which is made with partition boards being moisture-permeable flat parts and with spacer boards being corrugated parts, the partition boards and the spacer boards being alternately stacked, the total heat exchanger exchanging heat between the outdoor air and the indoor air; an indoor temperature sensor to measure a temperature of the indoor air; an indoor humidity sensor to measure a humidity of the indoor air; an outdoor temperature sensor to measure a temperature of the outdoor air; and a control unit to control operation of the air supply fan and the air exhaust fan on a basis of at least one state quantity estimated by substituting the indoor air temperature, the indoor air humidity, and the outdoor air temperature in a total heat exchanger model formula representing characteristics of the total heat exchanger.

Advantages of the Invention

The ventilator according to the present invention suppresses ice formation in a total heat exchanger, to save energy.

EMBODIMENTS

Embodiment 1

Figure 1:
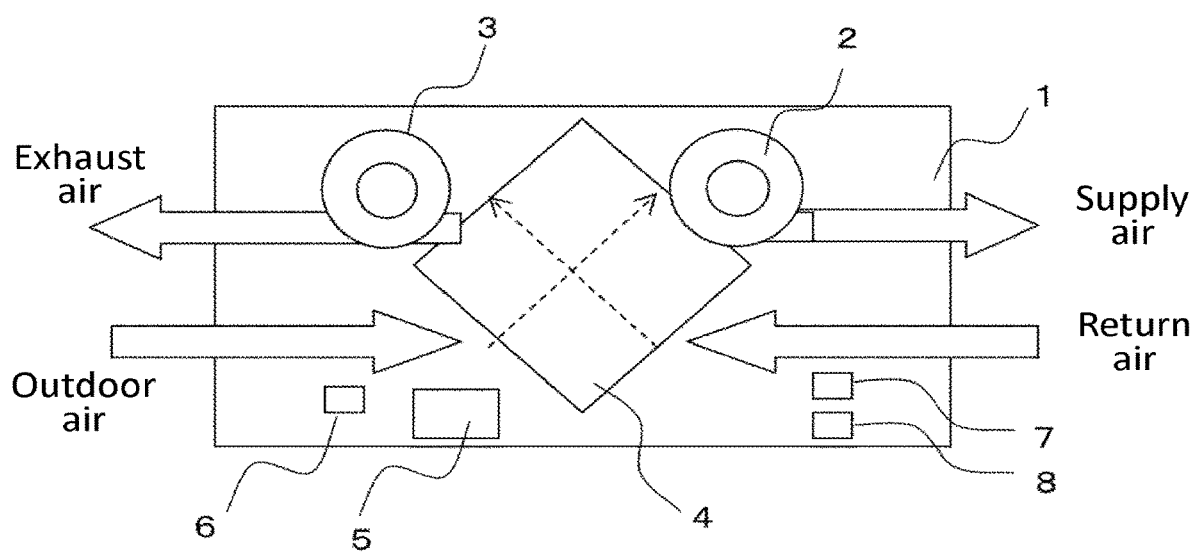
FIG. 1 is a functional configuration diagram of a ventilator according to Embodiment 1 of the present invention.

FIG. 1 is a diagram showing a ventilator 1 according to Embodiment 1. As shown in FIG. 1, the ventilator 1 includes an air supply fan 2, an air exhaust fan 3, a total heat exchanger 4, a control unit 5, an outdoor temperature sensor 6, an indoor temperature sensor 7, and an indoor humidity sensor 8. The left-hand side of the ventilator 1 indicates the outside of a building and the right-hand side thereof indicates the inside of a room. The indoor temperature sensor 7 and the indoor humidity sensor 8 may be a temperature-humidity-integrated sensor. For the indoor humidity sensor 8, a relative humidity sensor is preferable to an absolute humidity sensor. However, because a relative humidity can be obtained from an absolute humidity and a temperature, the indoor humidity sensor 8 may be an absolute humidity sensor.

(Description about Airflow in the Ventilator 1)

With reference to FIG. 1, description will be made about how air flows in the ventilator 1. The ventilator 1 having this structure takes air outside the building into the room via the total heat exchanger 4. In the following, the air flowing into the ventilator 1 from outside the building is called "outdoor air" and the air being taken into the room is called "supply air." Meanwhile, the air of the room is exhausted outside the building via the total heat exchanger 4. In the following, the air flowing into the ventilator 1 from the room is called "return air" and the air being exhausted outside the building is called "exhaust air." The total heat exchanger 4 exchanges heat between outdoor air and return air to provide the room with supply air whose temperature and humidity are adjusted. However, in some cases, outdoor air is taken into the room directly from outside, without passing through the total heat exchanger 4. In such a case, a bypass path, which is omitted in FIG. 1, is provided to take in outdoor air without passing through the total heat exchanger 4. The path passing through the total heat exchanger 4 and the bypass path are switched by a damper (not illustrated).

(Air Supply Fan 2 and Air Exhaust Fan 3)

The air supply fan 2 is a fan for taking air outside the building into the room. In this example, the air supply fan 2 is disposed closer to the room than the total heat exchanger 4. The air exhaust fan 3 is a fan for exhausting air in the room to the outside of the building. In this example, the air exhaust fan 3 is disposed close to the outside of the room than the total heat exchanger 4.

(Total Heat Exchanger 4)

Figure 2:
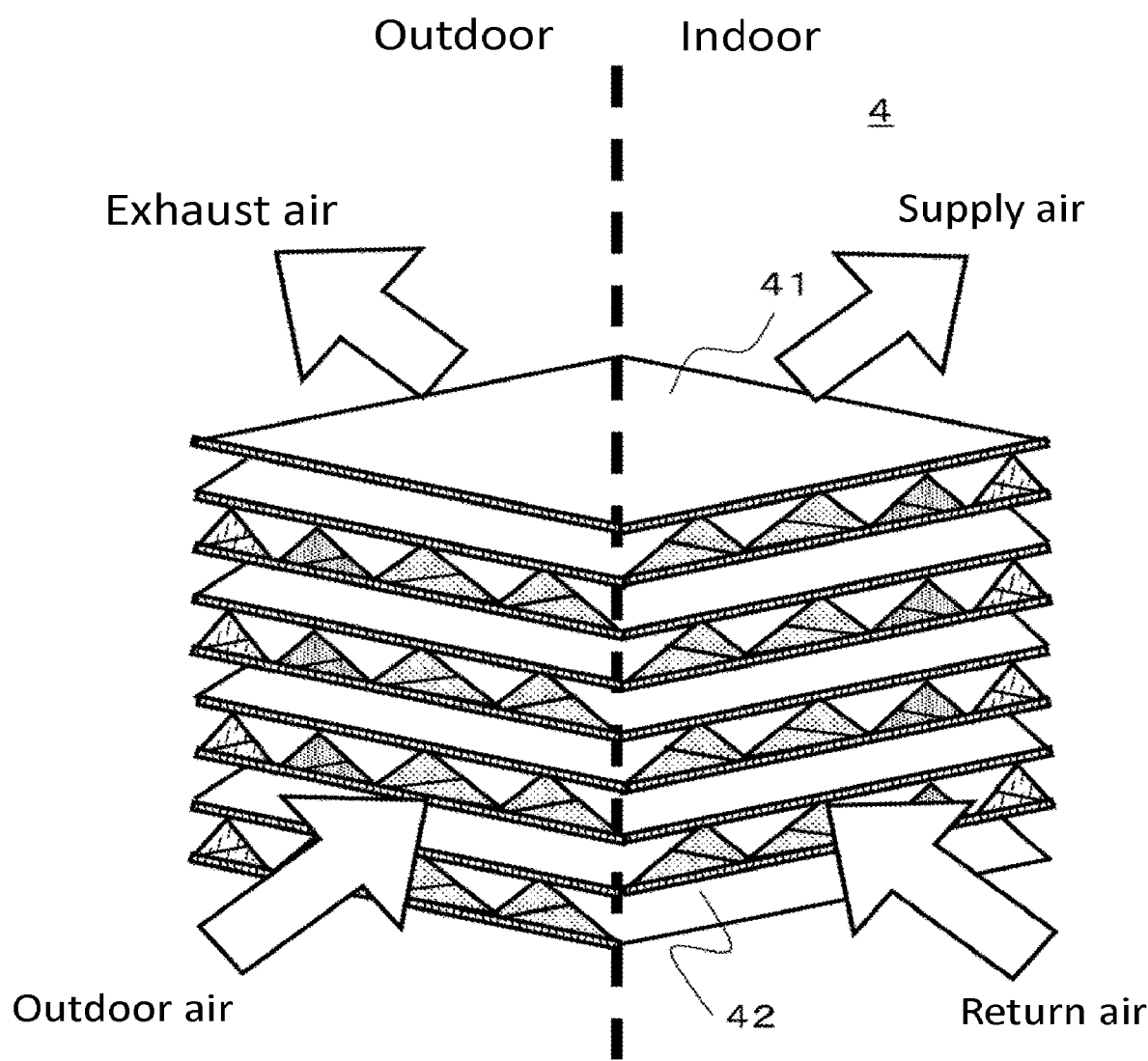
FIG. 2 is a diagram showing a configuration example of a total heat exchanger of the ventilator according to Embodiment 1 of the present invention.

FIG. 2 is a diagram showing a configuration example of the total heat exchanger 4. The left-half is for outdoor, the right-half is for indoor. From outside the room, outdoor air enters the total heat exchanger 4 to be supplied to the room. From the room, return air enters the total heat exchanger 4 to be exhausted outside the room. The total heat exchanger 4 exchanges total heat between the outdoor air and the return air. As shown in FIG. 2, the total heat exchanger 4 is, for example, formed in a quadrangular prism. In the total heat exchanger 4, partition boards 41 each being a flat plate member and spacer boards 42 each being a corrugated member are alternately stacked, so that the paths for outdoor air to flow are formed on one of consecutive side faces and the paths for exhaust air to flow are formed on the other of the consecutive side faces. The flat plate member and the corrugated member are made of a moisture-permeable material such as paper, so that it is possible for moisture to transfer between the supply air and the exhaust air. This makes it possible for the total heat exchanger 4 to exchange not only sensible heat but also latent heat.

In the total heat exchanger 4, the outdoor air being taken in and the indoor air being exhausted out are totally separated by the partition boards 41. Furthermore, the corrugation portions of the spacer board 42 serve as embankment to completely separate supply air paths from exhaust air paths. Also, the corrugated shape of the spacer boards 42 keeps the strength of the total heat exchanger 4. Heat and moisture are exchanged between the supply air and the exhaust air flowing along the upper surface of the partition boards 41 and the lower surface thereof. It is preferable, for example, that a total heat exchange paper having a high heat exchange efficiency and a high moisture permeability is used for the partition board 41, and a corrugated paper having a honeycomb structure is used for the spacer board 42.

(Explanation of Causes for Ice Formation and Dew Condensation in the Total Heat Exchanger 4)

In winter when the outdoor air is low while the indoor air is warmed by heating, the warm return air from the room passes through the total heat exchanger 4 and then the warm return air is cooled down below the dew point temperature by the cold outdoor air, condensing moisture in the return air into dew. When the outdoor air is lower than zero degrees C., the condensed dew is further cooled by the outdoor air to turn into ice and adhere to flow paths of the total heat exchanger 4. When ice or dew adheres to flow paths in the total heat exchanger 4, the flow paths are clogged to increase the pressure loss. Furthermore, the heat exchange area is reduced to lower its heat exchange efficiency.

(Configuration Example of the Control Unit 5)

Figure 3:
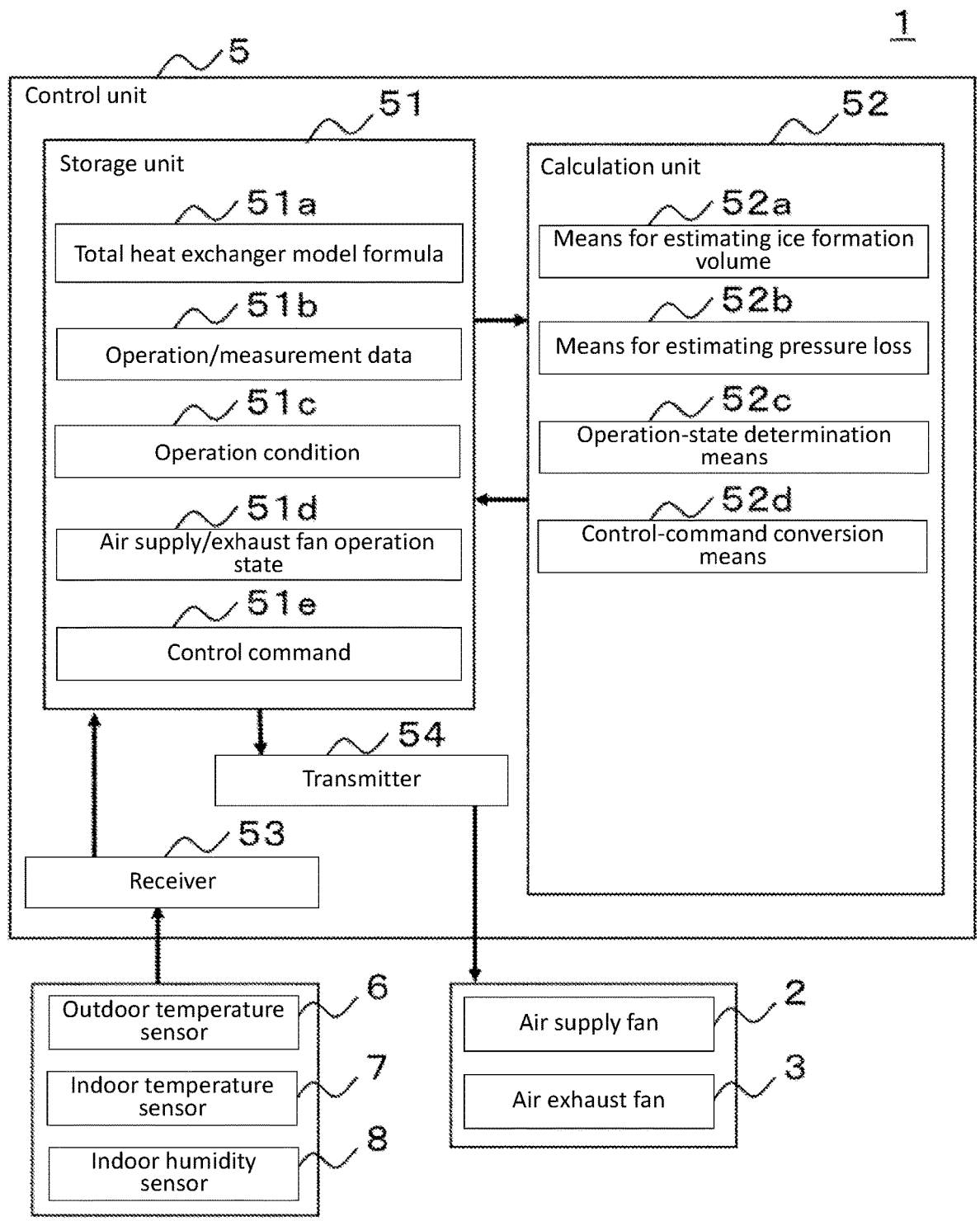
FIG. 3 is a system configuration diagram example showing a control unit of the ventilator according to Embodiment 1 of the present invention.
Figure 4:
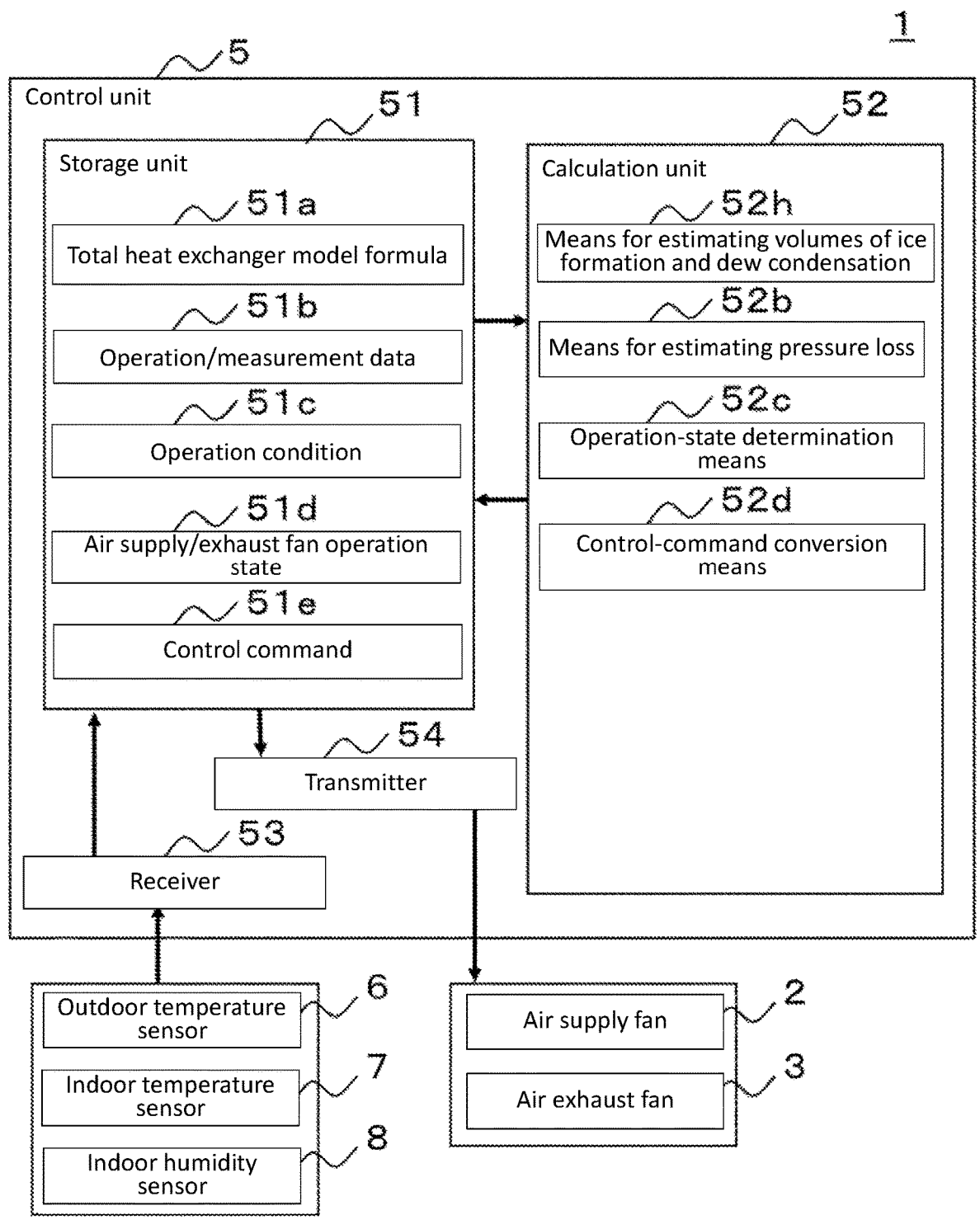
FIG. 4 is a system configuration diagram example showing the control unit of the ventilator according to Embodiment 1 of the present invention.

FIG. 3 and FIG. 4 each show a detailed system configuration of the control unit 5. As shown in FIG. 3 and FIG. 4, the control unit 5 includes a storage unit 51, a calculation unit 52, a receiver 53, and a transmitter 54.

The storage unit 51 is a device, such as memory, for storing information necessary for measurement and control in the ventilator 1. The memory is just an example, and any type of data storage device, including hard disk drive and SD card, may be used.

The calculation unit 52 is a device such as CPU and processor for calculating control commands 51e for the air supply fan 2, the air exhaust fan 3, etc., using data stored in the storage unit 51.

The receiver 53 is a device for receiving measurement data from sensing devices such as an outdoor temperature sensor 6, an indoor temperature sensor 7, and an indoor humidity sensor 8. These measurement data may include the operation states of devices such as the air supply fan 2, and the air exhaust fan 3.

The transmitter 54 is a device for transmitting control commands 51e to target devices such as the air supply fan 2 and the air exhaust fan 3. The transmitter may transmit instructions such as a data measurement instruction and an operation state acquisition instruction for devices and sensors.

The means for the receiver 53 and the transmitter 54 to communicate with the air supply fan 2, the air exhaust fan 3, the control unit 5, the outdoor temperature sensor 6, the indoor temperature sensor 7, and the indoor humidity sensor 8 may be each different communication means such as a dedicated communication line individually provided to each of the target devices and sensors. The communication may be wireless. As described above, the means for communication has no specific limitation about the type of cables, the type of protocols, etc. A communication means not listed above may be used. The communication means used by the receiver 53 and that used by the transmitter 54 may be the same, or may be different. That is, a plurality of kinds of communication means may be combined.

(Storage Unit 51)

The storage unit 51 stores information such as a total heat exchanger model formula 51a, operation/measurement data 51b, an ice formation volume $V_{freeze}$, a dew condensation volume $V_{dew}$, operation conditions 51c, air supply/exhaust fan operation states 51d, and control commands 51e. The air supply/exhaust fan operation states 51d mean the operation state information of the air supply fan 2 and the air exhaust fan 3. In the following description, the air supply fan 2 and the air exhaust fan 3 are sometimes collectively referred to as air supply/exhaust fans. The control commands 51e are information of the control commands mainly for the air supply/exhaust fans.

The operation conditions 51c stored in the storage unit 51 are information on conditions necessary for the processing of individual means in the calculation unit 52. For example, the storage unit 51 stores configuration information on the ventilator 1 which includes the airflow volume of the air supply fan 2, the airflow volume of the air exhaust fan 3, and the size and type of the total heat exchanger 4, and information such as cycles at which an operation-state determination means 52c determines the air supply/exhaust fan operation states 51d. The storage unit 51 also stores the types, periods, etc. of transmission/reception data for the receiver 53 and the transmitter 54.

The operation/measurement data 51b to be stored in the storage unit 51 includes operation data of the air supply fan 2 and the air exhaust fan 3, and measurement data from the outdoor temperature sensor 6, the indoor temperature sensor 7, and the indoor humidity sensor 8. The operation data of the air supply/exhaust fans includes information such as their operation state of high-power operation, low-power operation, operation stop etc., and an operation mode indicating which path is currently used for operation, i.e. either a path through the total heat exchanger 4 or a path through the bypass path. Furthermore, the operation/measurement data 51b may be combined with time information to be stored in the storage unit 51. In the above description, typical operation/measurement data 51b are simply listed; there is neither need to limit the data to the listed data, nor need to include all the listed data. Also, this information includes not only the current values but also the past data.

The total heat exchanger model formula 51a stored in the storage unit 51 is an air model representing its physical changes caused when the return air and the outdoor air pass through the total heat exchanger 4 to exchange heat. The details of the model will be described later in paragraphs for the total heat exchanger model formula 51a.

The air supply/exhaust fan operation state 51d and the control commands 51e, which are stored in the storage unit 51, are an air supply/exhaust fan operation state 51d such as a high-power operation, low-power operation, or operation stop which has been determined by the operation-state determination means 52c, and a control command 51e which has been determined by a control-command conversion means 52d, respectively.

Furthermore, the storage unit 51 may store data such as outdoor air humidity, supply air temperature, and supply air humidity which have been measured by sensors not illustrated in the figures.

(Total Heat Exchanger Model Formula 51a)

The total heat exchanger model formula 51a is an air model representing its physical change caused when the return air and the outdoor air pass through the total heat exchanger 4 to exchange heat under a condition that the air supply fan 2 and the air exhaust fan 3 are to be operated at given airflow volumes and given air conditions. Because heat exchange is performed step by step when passing the total heat exchanger 4, the total heat exchanger 4 is segmented into a plurality of lattices for a lattice-basis calculation.

The input information includes information about the material of the total heat exchanger 4, the structure thereof, an airflow volume of the air supply fan 2, an airflow volume of the air exhaust fan 3, an outdoor temperature, an outdoor humidity, an indoor temperature and an indoor humidity. The output information includes a temperature exchange efficiency, a humidity exchange efficiency, an ice formation volume $V_{freeze}$, a dew condensation volume $V_{dew}$, and a pressure in the total heat exchanger 4. The material and structure of the total heat exchanger 4 are fixed information.

The outdoor temperature/humidity and the indoor temperature/humidity can be measured, except the outdoor humidity, by the outdoor temperature sensor 6, the indoor temperature sensor 7, and the indoor humidity sensor 8. In winter when ice formation or dew condensation occurs as a problem, it is dry, the outdoor absolute humidity is low, and the outdoor relative humidity is high. In such conditions, it has been confirmed that there is no significant difference in ice formation in the total heat exchanger 4 when comparing a case in which the outdoor relative humidity is assumed to be a fixed value such as 80% with a case in which the outdoor humidity is measured. However, a humidity measured by an outdoor humidity sensor may be used. In this case, a sensor that serves as both an outdoor temperature sensor 6 and an outdoor humidity sensor may be used.

(Model in a Case of Neither Dew Condensation Nor Ice Formation)

Figure 5:
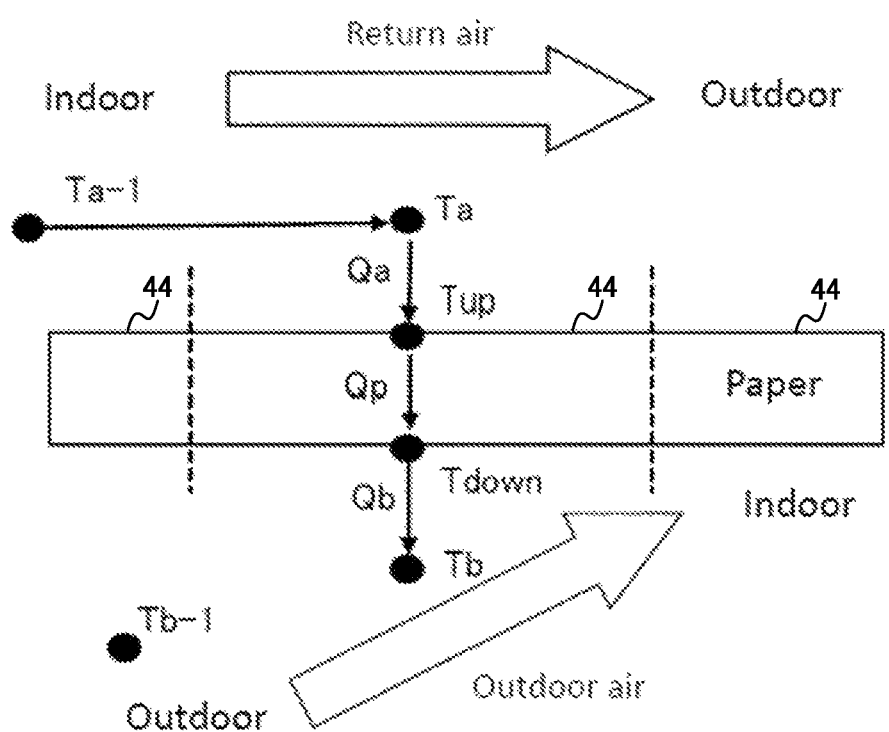
FIG. 5 is an image diagram showing how heat is transferred between return air and outdoor air which pass through the total heat exchanger of the ventilator according to Embodiment 1 of the present invention.

FIG. 5 shows how heat is transferred in winter operation conditions 51c in which heat is assumed to be transferred from high-temperature return air to low-temperature outdoor air. In the figure, an upper arrow represents the return air flowing from inside the room into outside the room, and a lower arrow represents the outdoor air flowing from outside the room into inside the room. The rectangle in the center represents a paper serving for total heat exchange. This paper corresponds to a partition board 41 which is used in the total heat exchanger 4 and has a high heat exchange efficiency and an excellent moisture permeability. Two dotted lines drawn downward from above the paper are added to segment the paper into predetermined block units 44 (aka, "lattices"). These are the same in FIG. 6 to FIG. 10 later described, and their descriptions will be omitted.

The heat of the warm return air from the room is first transferred to the surface of the paper (the upper side in the figure), then conducted in the paper thickness direction, and finally transferred from the back surface of the paper (the lower side of the figure) to the outdoor air. Formula (1) represents a heat amount $Q_a$ transferred from the return air to the paper surface; Formula (2) represents a heat amount $Q_p$ passing through the paper; and Formula (3) represents a heat amount $Q_b$ transferred from the back surface of the paper to the outdoor air.

[Formula 1]

$$Qa = hS'(T_a - T_{up}) \quad (1)$$

[Formula 2]

$$Q_p = \frac{\lambda S'}{l}(T_{up} - T_{down}) \quad (2)$$

[Formula 3]

$$Qb = h'S'(T_{down} - T_b) \quad (3)$$

Formula (4) represents the return air temperature $T_a$ in a certain lattice.

[Formula 4]

$$\rho C S v \times T_{a-1} = \rho C S v \times T_a + hS'(T_a - T_{up}) \quad (4)$$
$$T_a = \frac{\rho C S v \times T_{a-1} + hS' T_{up}}{\rho C S v + hS'}$$

In the same way, Formula (5) holds true with respect to the outdoor air side, and the outdoor air temperature $T_b$ in a certain lattice can be obtained.

[Formula 5]

$$\rho C S v \times T_{b-1} + hS'(T_{down} - T_b) = \rho C S v \times T_b \quad (5)$$
$$T_b = \frac{\rho C S v \times T_{b-1} + hS' T_{down}}{\rho C S v + hS'}$$

Here, the symbols are h: a convective heat transfer coefficient on the paper's upper side; h': a convective heat transfer coefficient on the paper's lower side; S': a heat exchange area; λ: a thermal conductivity of the paper; l: the thickness of the paper; ρ: the density of the air; C: the specific heat capacity of the air; S: the cross section area of lattice; v: a flow speed; $T_a$: the return air temperature in the heat exchanger; $T_{a-1}$: the return air temperature at a block in the heat exchanger, which is located one block upstream from where $T_a$ is obtained; $T_b$: the outdoor air temperature in the heat exchanger; $T_{b-1}$: the outdoor air temperature at a block in the heat exchanger, which is located one block upstream where $T_b$ is obtained; $T_{up}$: the temperature of the paper's upper surface; and $T_{down}$: the temperature of the paper's lower surface.

Figure 6:
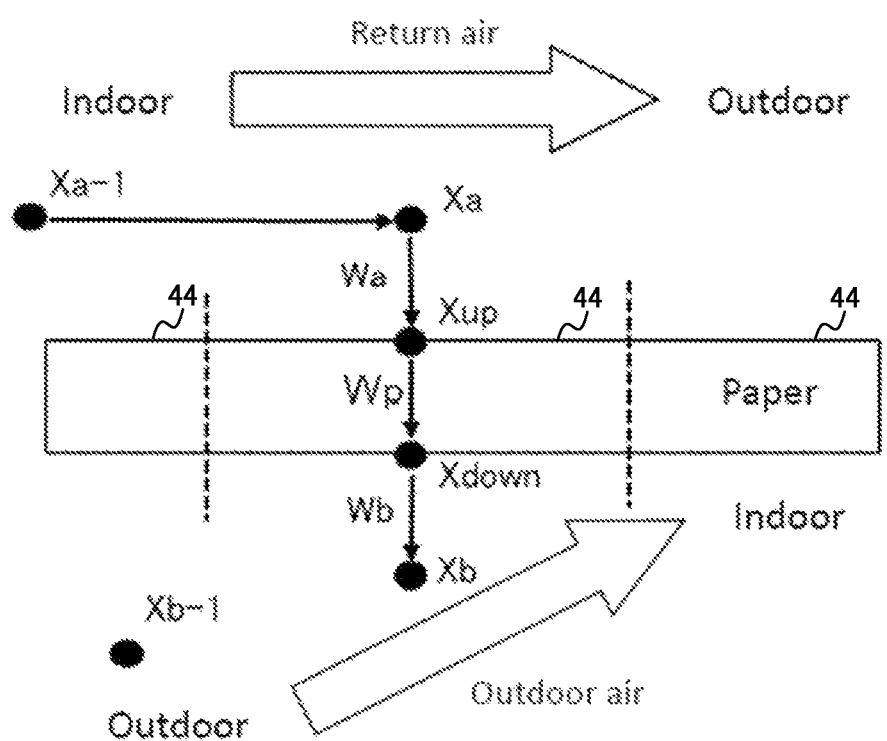
FIG. 6 is an image diagram showing how moisture is transferred between return air and outdoor air which pass through the total heat exchanger of the ventilator according to Embodiment 1 of the present invention.

FIG. 6 shows how moisture is transferred in winter operation conditions 51c in which moisture is assumed to be transferred from high humidity-return air to low humidity-outdoor air. The moisture contained in the wet return air coming from the room is first transferred to the paper's upper surface, then passed through the paper, and finally transferred to the outdoor air from the paper's lower surface. Formula (6) represents a moisture amount $W_a$ transferred from the return air to the paper's surface; Formula (7) represents a moisture amount $W_p$ passing through the paper; and Formula (8) represents a moisture amount $W_b$ transferred from the paper's back surface to the outdoor air.

[Formula 6]

$$W_a = h_D S'(X_a - X_{up}) \quad (6)$$

[Formula 7]

$$W_p = \alpha(X_{up} - X_{down}) \quad (7)$$

[Formula 8]

$$W_b = h_D S'(X_{down} - X_b) \quad (8)$$

Formula (9) represents the return air absolute humidity $X_a$ in a certain lattice.

[Formula 9]

$$\rho S v \times X_{a-1} = \rho S v \times X_a + h_D S'(X_a - X_{up}) \quad (9)$$
$$X_a = \frac{\rho S v \times X_{a-1} + h_D S' X_{up}}{\rho S v + h_D S'}$$

In the same way, Formula (10) holds true with respect to the outdoor air side, and the outdoor air humidity $X_b$ in a certain lattice can be obtained.

[Formula 10]

$$\rho S v \times X_{b-1} + h_D S'(X_{down} - X_b) = \rho S v \times X_b \quad (10)$$
$$X_b = \frac{\rho S v \times X_{b-1} + h_D S' X_{down}}{\rho S v + h_D S'}$$

Here, the symbols are: $h_D$: a mass transfer coefficient; $\alpha$: a moisture permeability resistance dependent on relative humidity; $X_a$: the return air absolute humidity in the heat exchanger; $X_{a-1}$: the return air absolute humidity at a block in the heat exchanger, which is located one block upstream from where $X_a$ is obtained; $X_b$: the outdoor air absolute humidity in the heat exchanger; $X_{b-1}$: the outdoor air absolute humidity at a block in the heat exchanger, which is located one block upstream where $X_b$ is obtained; $X_{up}$: the absolute humidity of the paper's upper surface; and $X_{down}$: the absolute humidity of the paper's lower surface.

The state of the air in the lattice is calculated using Formula (1) to Formula (10), to determine whether ice formation or dew condensation occurs. The ice formation occurs when the paper temperature is lower than the dew point temperature of the air in the lattice and lower than zero degrees C. The dew condensation occurs when the paper temperature is lower than the dew point temperature of the air in the lattice and higher than zero degrees C.

(Model in a Case of Dew Condensation or Ice Formation)

An ice formation volume $V_{freeze}$ in a case where ice formation occurs can be calculated by Formula (11); a dew condensation volume $V_{dew}$ in a case where dew condensation occurs can be calculated by Formula (12).
Here, $X_{saturation}$ is a saturation humidity in the heat exchanger.

[Formula 11]

$$V_{freeze} = h_D S'(X_a - X_{saturation}) \quad (11)$$

[Formula 12]

$$V_{dew} = h_D S'(X_a - X_{saturation}) \quad (12)$$

Figure 7:
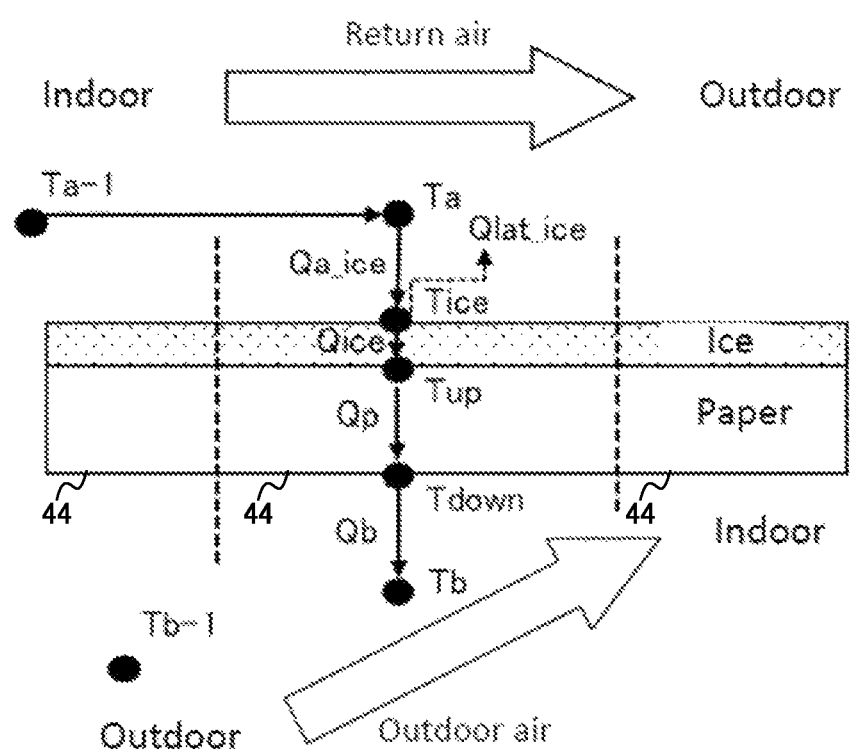
FIG. 7 is an image diagram showing how heat is transferred between return air and outdoor air which pass through the total heat exchanger in a case where ice formation occurs in the total heat exchanger of the ventilator according to Embodiment 1 of the present invention.
Figure 8:
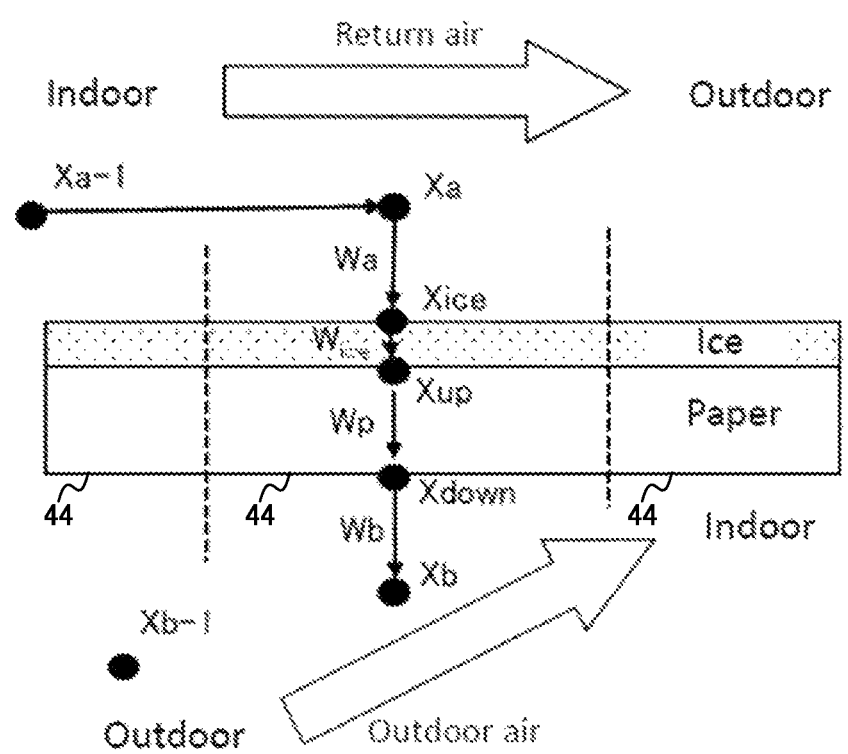
FIG. 8 is an image diagram showing how moisture is transferred between return air and outdoor air which pass through the total heat exchanger when ice formation occurs in the total heat exchanger of the ventilator according to Embodiment 1 of the present invention.

FIG. 7 is a diagram showing how heat is transferred when ice formation occurs; FIG. 8 is a diagram showing how moisture is transferred when ice formation occurs. The rectangle lying on the paper represents ice formed on the paper's surface (upper side). In a case where the return air is warm and wet and the outdoor air is cold, ice is formed on the upper side of the paper; therefore, the formed ice serves as thermal resistance and the latent heat produced by the ice formation transfers. Therefore, Formula (13) represents a heat amount $Q_{a\_ice}$ transferred from the return air to the surface of the ice; Formula (14) represents a heat amount $Q_{ice}$ passing through the ice; Formula (15) represents latent heat $Q_{lat\_ice}$ being solidification heat at the ice formation; and, Formula (16) represents a heat-amount balance formula at the ice formation.

[Formula 13]

$$Q_{a\_ice} = h S'(T_a - T_{ice}) \quad (13)$$

[Formula 14]

$$Q_{ice} = \frac{\lambda_{ice} S'}{l_{ice}} (T_{ice} - T_{up}) \quad (14)$$

[Formula 15]

$$Q_{lat\_ice} = (q_{ice} + q_{water}) \times V_{freeze} \quad (15)$$

[Formula 16]

$$Q_{a\_ice} + Q_{lat\_ice} = Q_{ice} \quad (16)$$

Here, the symbols are: $\lambda_{ice}$: the thermal conductivity of ice; $l_{ice}$: the thickness of ice; $q_{ice}$: the solidification heat of water; and $q_{water}$: the condensation heat of water.

Figure 9:
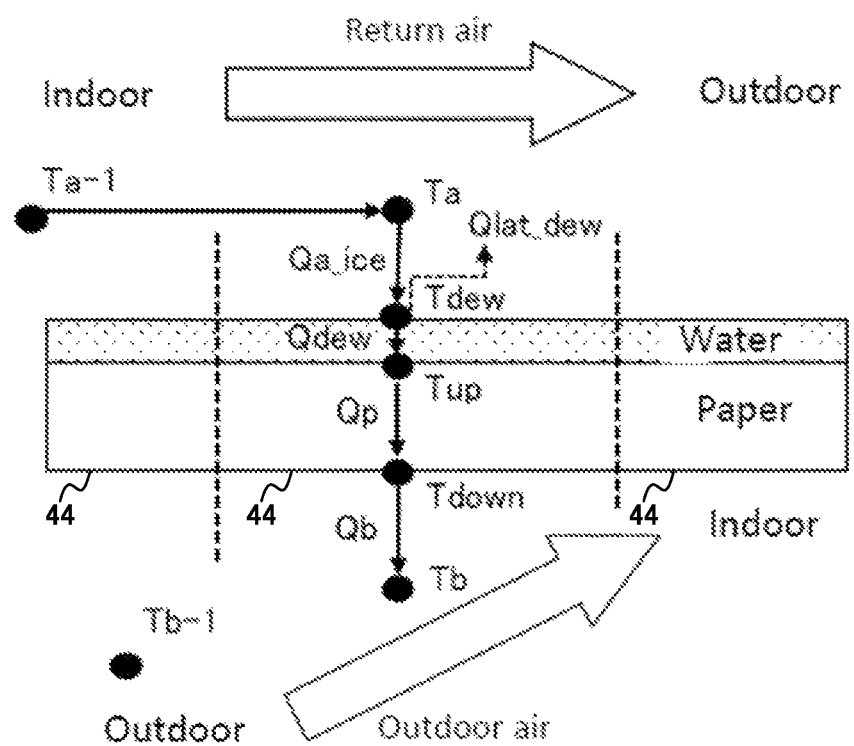
FIG. 9 is an image diagram showing how heat is transferred between return air and outdoor air which pass through the total heat exchanger when dew condensation occurs in the total heat exchanger of the ventilator according to Embodiment 1 of the present invention.
Figure 10:
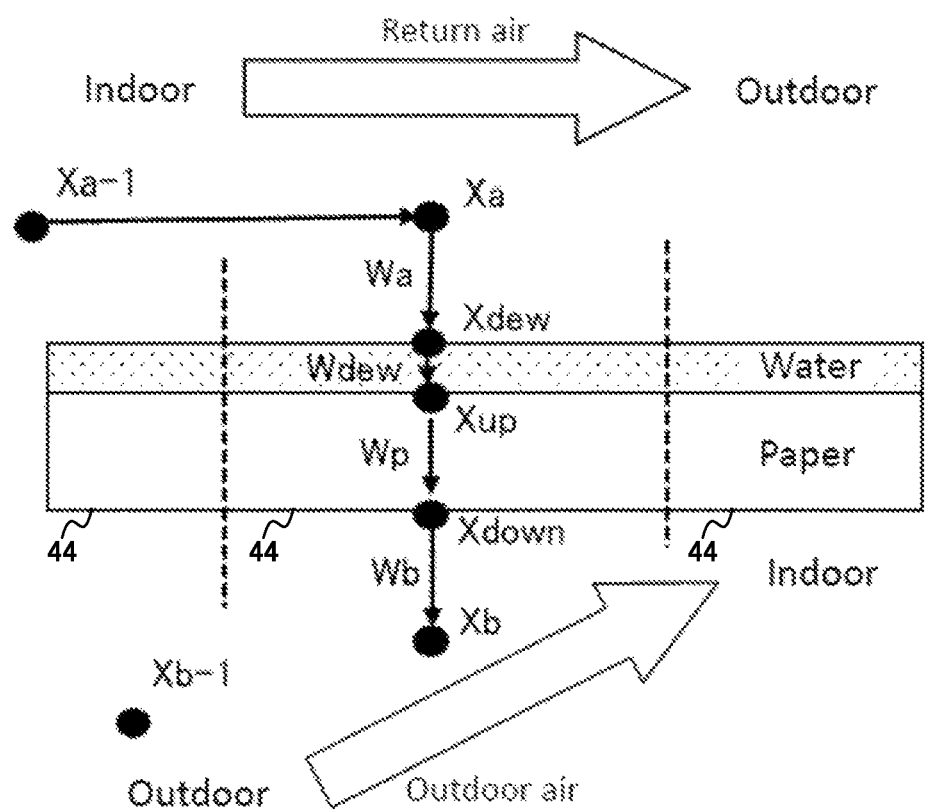
FIG. 10 is an image diagram showing how moisture is transferred between return air and outdoor air which pass through the total heat exchanger when dew condensation occurs in the total heat exchanger of the ventilator according to Embodiment 1 of the present invention.

FIG. 9 shows how heat is transferred when dew condensation occurs. FIG. 10 shows how moisture is transferred when dew condensation occurs. The rectangle lying on the paper represents water being dew condensed on the paper's surface (upper portion). In a case where the return air is warm and wet and the outdoor air is cold, dew is formed on the upper portion of the paper; therefore, the water serves as thermal resistance and the condensation heat produced at the dew condensation is transferred. Therefore, Formula (17) represents a heat amount $Q_{a\_dew}$ transferred from the return air to the water surface; Formula (18) represents a heat amount $Q_{dew}$ passing through the water; Formula (19) represents latent heat $Q_{lat\_dew}$ being the condensation heat at the dew condensation; and Formula (20) represents a heat-amount balance formula at the dew condensation.

[Formula 17]

$$Q_{a\_dew} = h S'(T_a - T_{dew}) \quad (17)$$

[Formula 18]

$$Q_{dew} = \frac{\lambda_{dew} S'}{l_{dew}} (T_{dew} - T_{up}) \quad (18)$$

[Formula 19]

$$Q_{lat\_dew} = q_{water} \times V_{dew} \quad (19)$$

[Formula 20]

$$Q_{a\_dew} + Q_{lat\_dew} = Q_{dew} \quad (20)$$

Here, symbols are: $\lambda_{dew}$: thermal conductivity of the water; and $l_{dew}$: thickness of the water.

In a case of moisture, part of the moisture amount subject to humidity exchange turns into ice or water and the rest is transferred to the outdoor air. When it is assumed here that the humidity of the ice or the water is equivalent to the humidity of the paper's surface, a moisture balance formula (21) for ice formation hold true and a moisture balance formula (22) for dew condensation hold holds true.

[Formula 21]

$$W_a - W_{ice} = W_p \quad (21)$$

[Formula 22]

$$W_a - W_{dew} = W_p \quad (22)$$

(Model in a Case of Ice Melting)

In order to melt the ice formed in the total heat exchanger 4, an operation is sometimes performed in which the air supply fan 2 is stopped and only the air exhaust fan 3 is operated to supply warm return air to the total heat exchanger 4. For that moment, it is necessary to model a phenomenon in which the ice in the total heat exchanger 4 melts, thereby decreasing the ice formation volume $V_{freeze}$. Formula (23) represents a heat balance formula in the ice melting.

[Formula 23]

$$Qa_{\_ice} = (q_{ice} + \rho_{ice} C_{ice} \times (0 - T_{ice})) \times V_{fusion} \quad (23)$$

Here, the symbols are: $\rho_{ice}$: the density of ice; $C_{ice}$: the specific heat capacity of ice; and $V_{fusion}$: a volume of ice to melt.

The melt volume is calculated by using Formula (23) and Formula (13). By subtracting the melt volume from the total of the volume $V_{freeze}$ of ice having been previously formed, the volume $V_{freeze}$ of ice currently remaining in the total heat exchanger 4 is calculated.

In a case of dew condensation, a phenomenon of ice melting does not occur. However, a decrease in the dew condensation volume may be obtained using a model which simulates, as Formula (12), the return air's exchanging moisture. Also, a decrease in the dew condensation volume may be obtained using a model which simulates the static pressure change in the total heat exchanger 4 due to the stopping of the air supply fan 2, and simulates the condensation water's flowing out from the total heat exchanger 4 according to the installation conditions of the total heat exchanger 4.

(Model for Pressure Loss Calculation)

The pressure loss $\Delta P$ of the air passing through the total heat exchanger 4 is calculated from the ice formation volume $V_{freeze}$ in the total heat exchanger 4 and the dew condensation volume $V_{dew}$ therein, using Formula (24) to Formula (28). Formula (24) represents the cross section area $S_{freeze}$ of ice formation volume; Formula (25) represents the cross section area $S_{dew}$ of dew condensation volume; Formula (26) represents a closure rate CLO; Formula (27) represents an equivalent diameter de in the closure state; Formula (28) represents a Reynolds number Re; and, Formula (29) represents the pressure loss $\Delta P$ when a laminar flow is assumed.

[Formula 24]

$$S_{freeze} = \frac{V_{freeze\_L}}{\rho_{\_ice}} \quad (24)$$

[Formula 25]

$$S_{dew} = \frac{V_{dew\_L}}{\rho_{\_dew}} \quad (25)$$

[Formula 26]

$$CLO = \frac{S_{freeze}}{S_{\_flow}} \quad (26)$$

[Formula 27]

$$de = \frac{4 S_{\_flow}}{A_{\_flow}} \quad (27)$$

[Formula 28]

$$Re = \frac{u \cdot de}{v} \quad (28)$$

[Formula 29]

$$\Delta P = \frac{64}{Re} \frac{l}{de} \times \frac{1}{2} \rho u^2 \quad (29)$$

Here, the symbols are: $S_{freeze}$: the cross section area of ice formation volume; $S_{dew}$: the cross section area of dew condensation volume; $V_{freeze\_L}$: a total ice formation volume per length of lattice; $V_{dew\_L}$: a total dew condensation volume per length of lattice; $\rho_{\_ice}$: the density of formed ice; $\rho_{\_dew}$: the density of water; $S_{\_flow}$: the cross section area of air flow path; $A_{\_flow}$: the perimeter of air flow path; $\Delta P$: a pressure loss; Re: a Reynolds number; L: the air flow path length; de: an equivalent diameter; ρ: the density of air; u: a flow speed; and v: a kinematic viscosity coefficient.

Up to this point, an example of the total heat exchanger model formula 51a has been described. However, the total heat exchanger model formula 51a is not limited to this example. If the total heat exchanger model formula 51a gives (estimates) at least one of the ice formation volume $V_{freeze}$ and the dew condensation volume $V_{dew}$, it does not matter how the total heat exchanger model formula calculates them. The total heat exchanger model formula 51a at least uses the measurements of an outdoor temperature sensor 6, an indoor temperature sensor 7, and an indoor humidity sensor 8, to give at least one of the ice formation volume $V_{freeze}$ of the total heat exchanger 4 and the dew condensation volume $V_{dew}$ thereof.

Also note that if the total heat exchanger model formula 51a gives (estimates) the ice formation volume $V_{freeze}$ and the dew condensation volume $V_{dew}$, it is normal that the pressure loss $\Delta P$ can be subsequently given (estimated).

(Variations of the Total Heat Exchanger Model Formula 51a)

The total heat exchanger model formula 51a described so far is a physical model for heat transfer and moisture transfer. Approximation equations other than the physical model may be used for calculating the ice formation volume $V_{freeze}$, the dew condensation volume $V_{dew}$, and the pressure loss $\Delta P$. For example, on the basis of the information on the material and structure of the total heat exchanger 4, an estimation formula for the pressure loss $\Delta P$ may be prepared in advance in which an outdoor air temperature and an operation time at the outdoor air temperature are included as explanatory variables.

Figure 11:
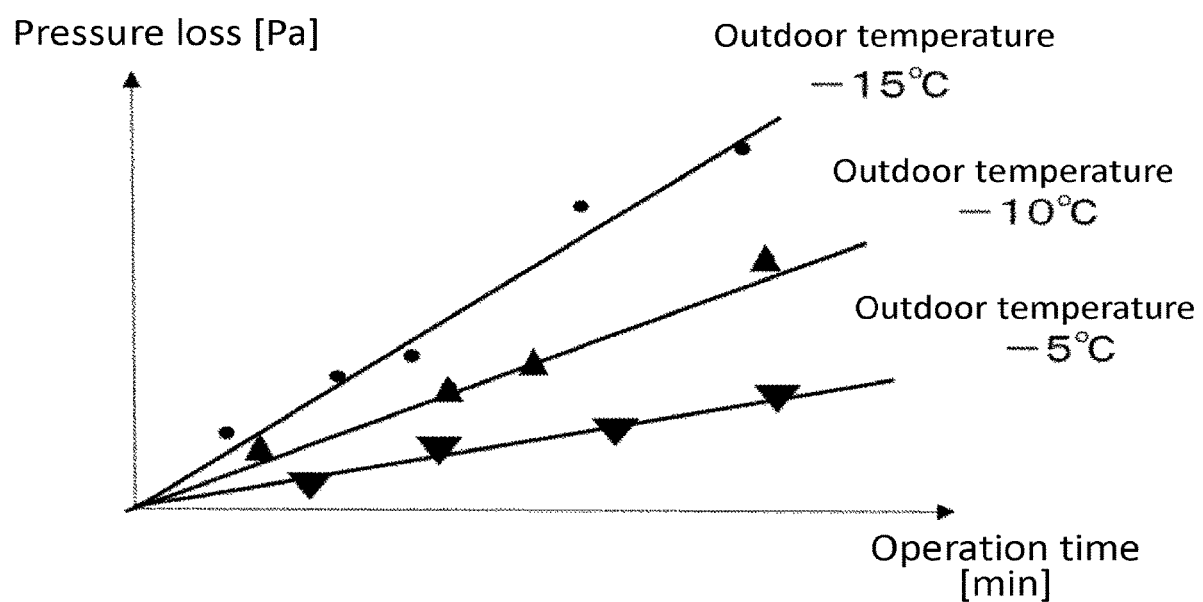
FIG. 11 is an image graph showing relations between operation time and pressure loss in the total heat exchanger of the ventilator according to Embodiment 1 of the present invention.

FIG. 11 is an image graph showing the relations between the pressure loss $\Delta P$ and the operation time to be obtained when a total heat exchanger 4 is operated at outdoor air temperatures: −15 degrees C., −10 degrees C., and −5 degrees C. Note that the relations between the pressure loss $\Delta P$ and the operation time are not limited to linear ones. For example, if such data are obtained in advance by experiments, the pressure loss $\Delta P$ can be obtained by an approximation equation having parameters of the outdoor air temperature, the indoor temperature, and the indoor humidity. The above description is applicable to ice melt cases as well as ice formation cases.

(Calculation Unit 52)

A calculation unit 52 being a processor or the like includes: a means 52h for estimating volumes of ice formation and dew condensation (or a means 52a for estimating ice formation volume); a means 52*b* for estimating pressure loss; an operation-state determination means 52*c*; and a control-command conversion means 52*d*.

(Means 52*a* for Estimating Ice Formation Volume)

The means 52*a* for estimating ice formation volume calculates an ice formation volume $V_{freeze}$ in the total heat exchanger 4 from the operation/measurement data 51*b*, the operation conditions 51*c*, and the total heat exchanger model formula 51*a* of the ventilator 1, which are stored in the storage unit 51 being a memory or the like. By substituting the operation conditions 51*c* stored in the storage unit 51 and the measured values obtained from the outdoor temperature sensor 6, the indoor temperature sensor 7, the indoor humidity sensor 8 etc. in the total heat exchanger model formula 51*a*, the state of the air passing through the total heat exchanger 4 and the temperature of the paper can be calculated, whereby it is possible to determine whether ice formation occurs.

(Means 52*h* for Estimating Volumes of Ice Formation and Dew Condensation)

The means 52*h* for estimating volumes of ice formation and dew condensation is upwardly compatible with the means 52*a* for estimating ice formation volume. Similarly to the means 52*a* for estimating ice formation volume, the means 52*h* for estimating volumes of ice formation and dew condensation calculates an ice formation volume $V_{freeze}$ and a dew condensation volume $V_{dew}$ in the total heat exchanger 4 from the operation/measurement data 51*b*, the operation conditions 51*c*, and the total heat exchanger model formula 51*a* of the ventilator 1, which are stored in the storage unit 51 being a memory or the like. By substituting the operation conditions 51*c* stored in the storage unit 51 and the measured values obtained from the outdoor temperature sensor 6, the indoor temperature sensor 7, the indoor humidity sensor 8 etc. in the total heat exchanger model formula 51*a*, the state of the air passing through the total heat exchanger 4 and the temperature of the paper can be calculated, whereby it is possible to determine whether ice formation or dew condensation occurs.

When it is determined that ice formation occurs, it is possible, by using the ice formation model of the total heat exchanger model formula 51*a*, to calculate an ice formation volume $V_{freeze}$ produced per unit time in the total heat exchanger 4. In a case where the air supply fan 2 is stopped and only the air exhaust fan 3 is operated, it is possible, by using an ice melting model of the total heat exchanger model formula 51*a*, to calculate a melt volume per unit time and a total ice formation volume $V_{freeze}$ that remains in the total heat exchanger 4 after the ice formation volume $V_{freeze}$ reduces due to the ice melt.

In a case where it is determined that dew condensation occurs, it is possible, by using the dew condensation model of the total heat exchanger model formula 51*a*, to calculate a dew condensation volume $V_{dew}$ which is produced per unit time in the total heat exchanger 4. When the air supply fan 2 is stopped and only the air exhaust fan 3 is operated, it is possible, by using a dew condensation decreasing model of the total heat exchanger model formula Ma, to calculate a dew condensation decrease per unit time and a total dew condensation volume $V_{dew}$ that remains in the total heat exchanger 4 after the dew condensation volume $V_{dew}$ decreases due to the dew condensation decrease.

(Means 52*b* for Estimating Pressure Loss)

The means 52*b* for estimating pressure loss calculates the pressure loss $\Delta P$ of the total heat exchanger 4 from the operation/measurement data 51*b*, the operation conditions 51*c* and the total heat exchanger model formula 51*a* of the ventilator 1 which are stored in the storage unit 51 being a memory or the like, and from the calculation results of the means 52*h* for estimating volumes of ice formation and dew condensation (or the means 52*a* for estimating ice formation volume).

(Operation-State Determination Means 52*c*)

The operation-state determination means 52*c* determines air supply/exhaust fan operation states 51*d* on the basis of the ice formation volume $V_{freeze}$ and the dew condensation volume View of the total heat exchanger 4. The air supply/exhaust fan operation states 51*d* include, for example, the airflow volume, its operation states (including a high power operation and a low power operation), and a stop state. In a case where both the air supply fan 2 and the air exhaust fan 3 are in operation and where both the ice formation volume $V_{freeze}$ and the dew condensation volume $V_{dew}$ in the total heat exchanger 4 estimated by the means 52*h* for estimating volumes of ice formation and dew condensation (or the means 52*a* for estimating ice formation volume) are zero, the air supply/exhaust fan operation state 51*d* continues to stay in the same state as that in the previous time.

In a case where both the air supply fan 2 and the air exhaust fan 3 are in operation and where the pressure loss $\Delta P$ in the total heat exchanger 4 exceeds a predetermined pressure loss threshold, the air supply fan 2 is stopped and only the air exhaust fan 3 is operated, whereby the ice formed in the total heat exchanger 4 is melted by the warm return air coming from the room.

The duration during which the air supply fan 2 is stopped and only the air exhaust fan 3 is operated is, for example, a time period that starts from the time when it is determined that the pressure loss $\Delta P$ exceeds a pressure loss threshold and lasts for a period predetermined according to the outdoor air temperature measured by the outdoor temperature sensor 6. For example, in a case where the outdoor air temperature is below −15 degrees C. at the time when it is determined that the pressure loss exceeds the threshold, the air supply fan 2 is stopped for 45 minutes; in a case of a range between −15 and −10 degrees C., the air supply fan is stopped for 30 minutes; and in a case of a range between −10 and −5 degrees C., the air supply fan is stopped for 15 minutes. The lower the outdoor air temperature is, the longer the air supply fan 2 is to be kept stopped. The stoppage durations of the air supply fan 2 may be determined in advance by experiments on the basis of the information on the material and structure of the total heat exchanger 4. The stoppage durations of the air supply fan 2 may be determined in advance according to not only the outdoor air temperature but also the indoor temperature and humidity measured by the indoor temperature sensor 7 and the indoor humidity sensor 8.

Or, instead of determining in advance the stoppage durations of the air supply fan 2, its stoppage duration may be determined using the pressure loss $\Delta P$. Such operation may be that the ice formation volume $V_{freeze}$, the dew condensation volume $V_{dew}$, and the pressure loss $\Delta P$ in the total heat exchanger 4 are successively calculated using the total heat exchanger model formula 51*a*, the means 52*h* for estimating volumes of ice formation and dew condensation (or the means 52*a* for estimating ice formation volume), and the means 52*b* for estimating pressure loss, and that until the pressure loss $\Delta P$ becomes the threshold or lower, the air supply fan 2 is kept stopped with only the air exhaust fan 3 operated.

Another operation may be that no threshold-determination of the pressure loss $\Delta P$ is made, and that the air supply fan 2 is kept stopped with only the air exhaust fan 3 operated until the ice formation volume $V_{freeze}$ and the dew condensation volume View in the total heat exchanger 4 fall below thresholds. Here, a different threshold may be used for each of the ice formation volume $V_{freeze}$ and the dew condensation volume $V_{dew}$.

Furthermore, instead of the stoppage duration of the air supply fan 2, the airflow volumes of the air supply fan 2 and the air exhaust fan 3 may be set in advance according to the pressure loss ΔP. For example, in a case where the outdoor air temperature is low and the pressure loss ΔP become increased, the airflow volumes of the air supply fan 2 and the air exhaust fan 3 are reduced to suppress increases in the ice formation volume $V_{freeze}$ and the dew condensation volume $V_{dew}$ and also suppress an increase in the pressure loss ΔP. In a case where, in spite of having reduced the airflow volumes, the pressure loss ΔP exceeds the pressure loss threshold, the control process of the air supply fan 2 may be changed to a process in which the air supply fan 2 is stopped for a duration.

When the stoppage duration of the air supply fan 2 expires, the air supply fan 2 is operated again and stays in operation until the ice formation volume $V_{freeze}$ and the dew condensation volume $V_{dew}$ exceed the thresholds. In addition, a different threshold is sometimes used for each of the ice formation volume $V_{freeze}$ and the dew condensation volume $V_{dew}$.

(Control-Command Conversion Means 52d)

The control-command conversion means 52d converts the air supply/exhaust fan operation states 51d, which have been determined by the operation-state determination means 52c and then stored in the storage unit 51, into control commands 51e which are to be actually given as instructions to the air supply fan 2 and the air exhaust fan 3. Here, the air supply/exhaust fan operation states 51d mean information on the operation states of the air supply fan 2 and the air exhaust fan 3.

For example, in a case where the pattern of a control command 51e to the air supply fan 2 specifies that the state of the airflow is "strong", "medium", "gentle", or "in suspension", the stored air supply/exhaust fan operation state 51d is converted into an instruction corresponding to "strong", "medium", "gentle", or "in suspension", respectively, to be stored in the storage unit 51 as the control commands 51e. The above-described command pattern listed as "strong", "medium", "gentle", or "in suspension" is just an example, and the pattern of the control commands 51e is not limited to these patterns.

Because the control commands 51e applicable for the air supply fan 2 and the air exhaust fan 3 differ depending on individual models of the ventilators 1, the control commands 51e are generated in accordance with the models. Information necessary for dealing with such dependence is stored in the storage unit 51 as the operation conditions 51c. In a case where the air supply/exhaust fan operation states 51d determined by the operation-state determination means 52c can be used directly as the instructions for the air supply fan 2 and the air exhaust fan 3, conversion is not required and, thus, the air supply/exhaust fan operation states 51d stored in the storage unit 51 and the control commands 51e are the same.

(Flowcharts)

Figure 12:
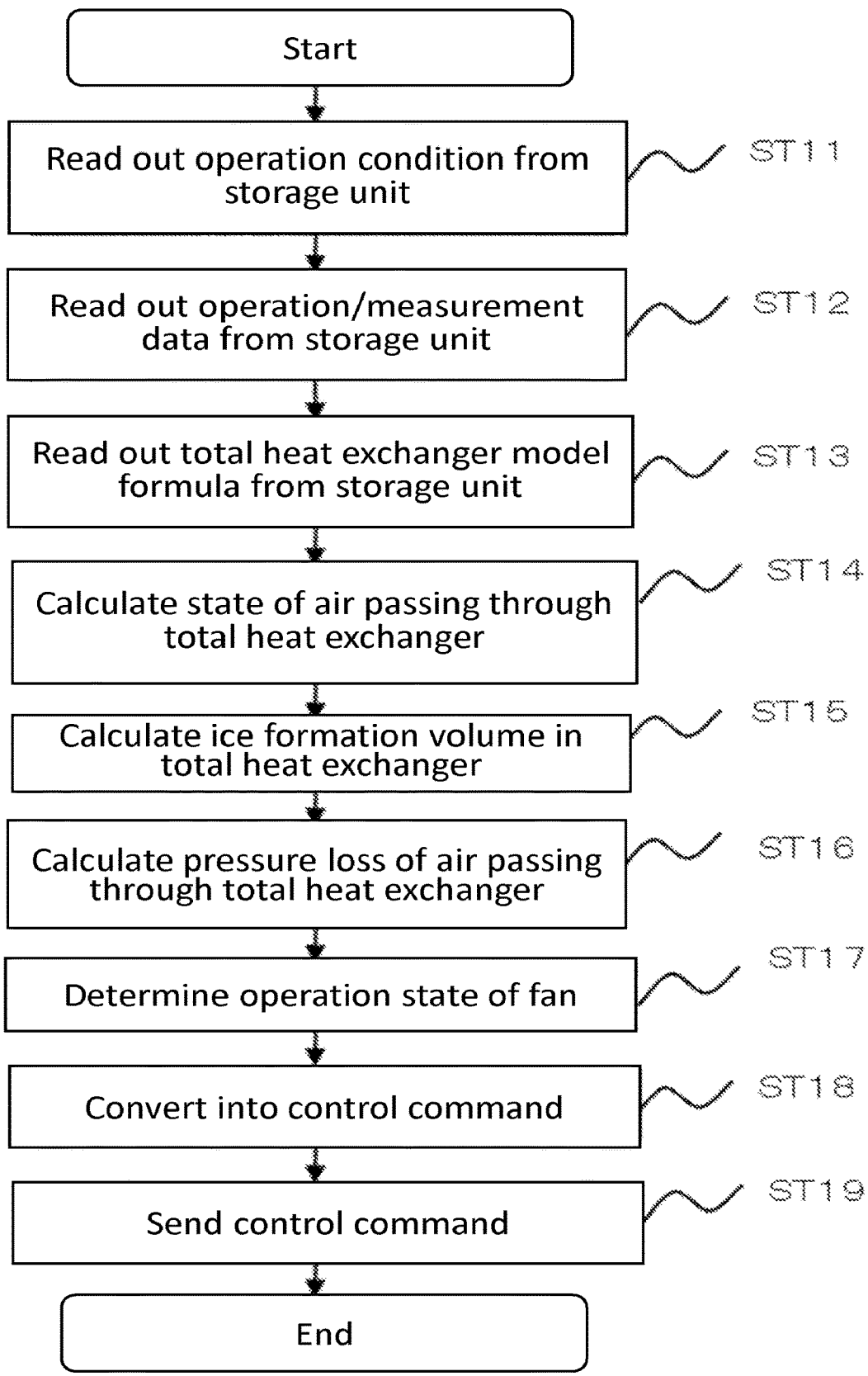
FIG. 12 is a flowchart showing the process of the control unit of the ventilator according to Embodiment 1 of the present invention.
Figure 13:
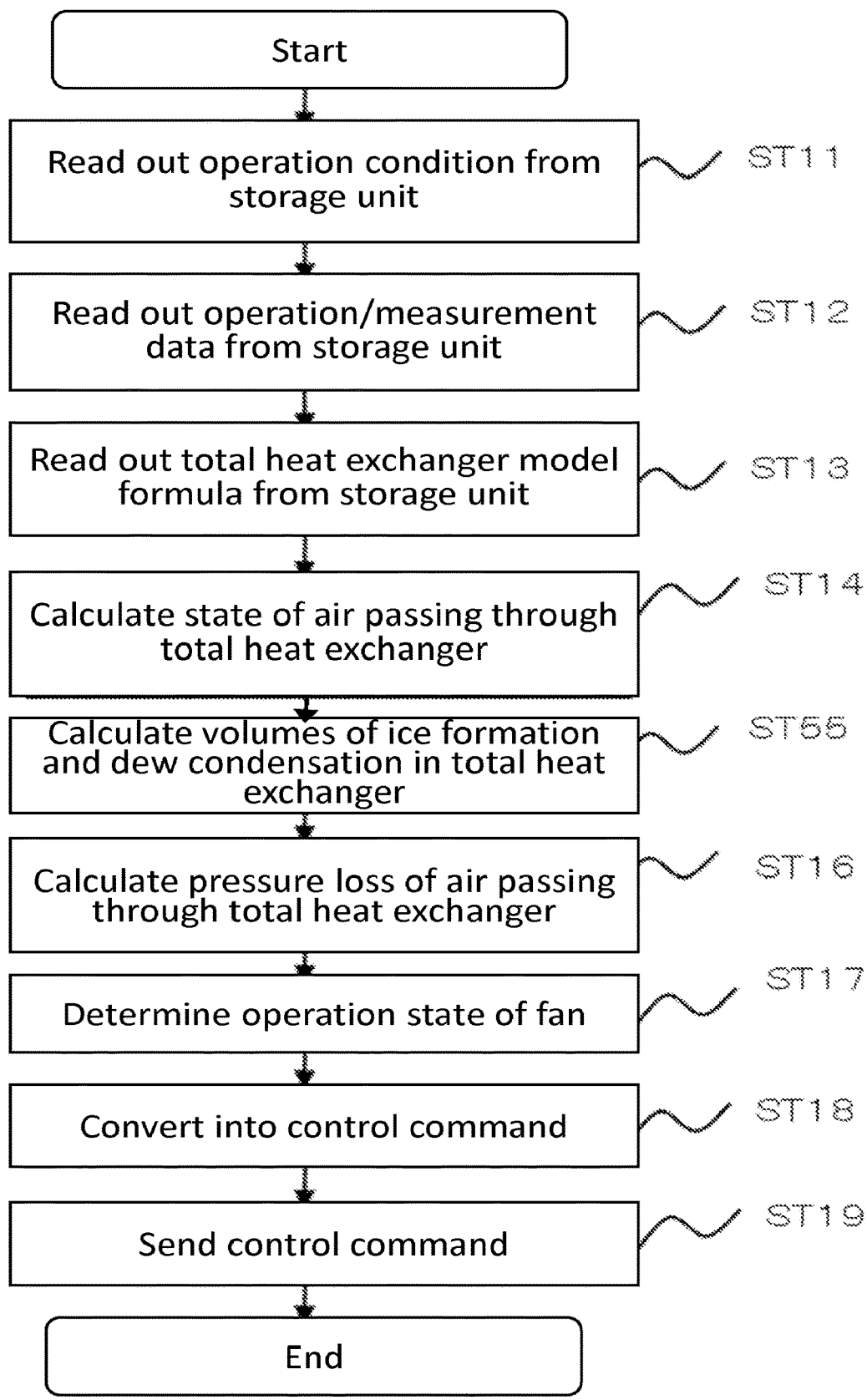
FIG. 13 is another flowchart showing the process in the control unit of the ventilator according to Embodiment 1 of the present invention.

FIG. 12 and FIG. 13 are each a flowchart showing the process of the control unit 5 of the ventilator 1 according to Embodiment 1. In the process shown in FIG. 12, the means 52a for estimating ice formation volume is used; in the process shown in FIG. 13, the means 52h for estimating volumes of ice formation and dew condensation is used. Because the means 52a is interchangeable with the means 52h, there is no difference therebetween except that, in FIG. 13, step ST15 in FIG. 12 is replaced with step ST55.

These processing flows are performed at predetermined time intervals. For example, a time interval is one minute, ten minutes, thirty minutes, or the like. There is no need to fix the time interval, and the time interval may be changed according to day and night, or seasons (more specifically, months in a year). The time interval is stored in the storage unit 51 as a part of the operation conditions 51c. The processing flow will be described below. Details executed in each step have been described in the description of the function of each means included in the calculation unit 52, therefore the detailed description will be omitted.

In step ST11, the calculation unit 52 reads out the operation conditions 51c from the storage unit 51. In step ST12, the calculation unit 52 reads out the operation/measurement data 51b of the ventilator 1 from the storage unit 51. In step ST13, the calculation unit 52 reads out the total heat exchanger model formula 51a from the storage unit 51. In step ST14, the means 52h for estimating volumes of ice formation and dew condensation (or the means 52a for estimating ice formation volume) determines the state of the air passing through the total heat exchanger 4 by using the total heat exchanger model formula 51a.

In step ST55 (or step ST15), the means 52h for estimating volumes of ice formation and dew condensation (or the means 52a for estimating ice formation volume) calculates the ice formation volume $V_{freeze}$ in the total heat exchanger 4 by using the total heat exchanger model formula 51a. In step ST16, the means 52b for estimating pressure loss calculates the pressure loss ΔP of the air passing through the total heat exchanger 4 by using the total heat exchanger model formula 51a. In step ST17, the operation-state determination means 52c determines operation states of the air supply fan 2 and the air exhaust fan 3. In step ST18, the control-command conversion means 52d converts the air supply/exhaust fan operation states 51d into the control commands 51e. In step ST19, the transmitter 54 sends the control commands 51e to the air supply fan 2 and the air exhaust fan 3.

As described above, the ventilator 1 according to Embodiment 1 calculates the ice formation volume $V_{freeze}$ in the total heat exchanger 4 by using the total heat exchanger model formula 51a and then determines, on the basis of the calculation result, the air supply/exhaust fan operation states 51d. This brings an effect that the ice formation volume $V_{freeze}$ in the total heat exchanger 4 is reduced and also brings an effect that durations for heat exchanging and ventilation are increased to improve energy efficiency.

As described above, a ventilator includes: an air supply fan to supply outdoor air to a room; an air exhaust fan to exhaust indoor air, out of the room; a total heat exchanger which is made with partition boards being moisture-permeable flat parts and with spacer boards being corrugated parts, the partition boards and the spacer boards being alternately stacked, the total heat exchanger exchanging heat between the outdoor air and the indoor air; an indoor temperature sensor to measure a temperature of the indoor air; an indoor humidity sensor to measure a humidity of the indoor air; an outdoor temperature sensor to measure a temperature of the outdoor air; and a control unit to control operation of the air supply fan and the air exhaust fan on a basis of at least one state quantity estimated by substituting the indoor air temperature, the indoor air humidity, and the outdoor air temperature in a total heat exchanger model formula representing characteristics of the total heat exchanger.

The total heat exchanger model formula represents how the heat (temperature) and the moisture (humidity) to be exchanged between the outdoor air and the indoor air passing through the total heat exchanger are transferred.

Here, the state quantities to be estimated include an ice formation volume, and the estimated state quantities also include a pressure loss of the airflow generated by the air supply fan.

When the pressure loss exceeds a threshold, only the air exhaust fan is operated.

Furthermore, when the pressure loss exceeds a threshold, the stoppage duration of the air supply fan is made longer as the indoor air temperature becomes lower.

Embodiment 2

Figure 14:
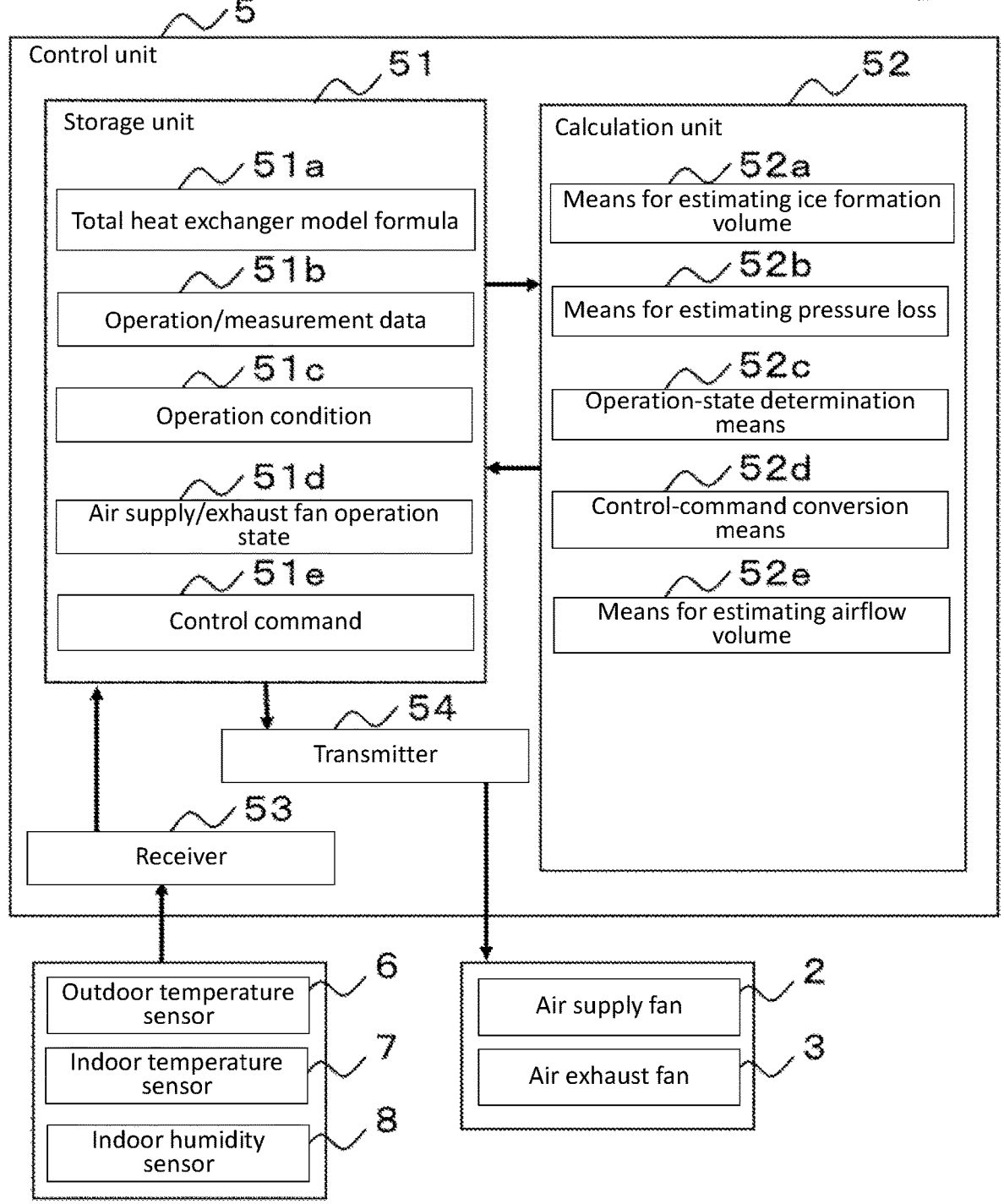
FIG. 14 is a system configuration diagram example showing a control unit of a ventilator according to Embodiment 2 of the present invention.
Figure 15:
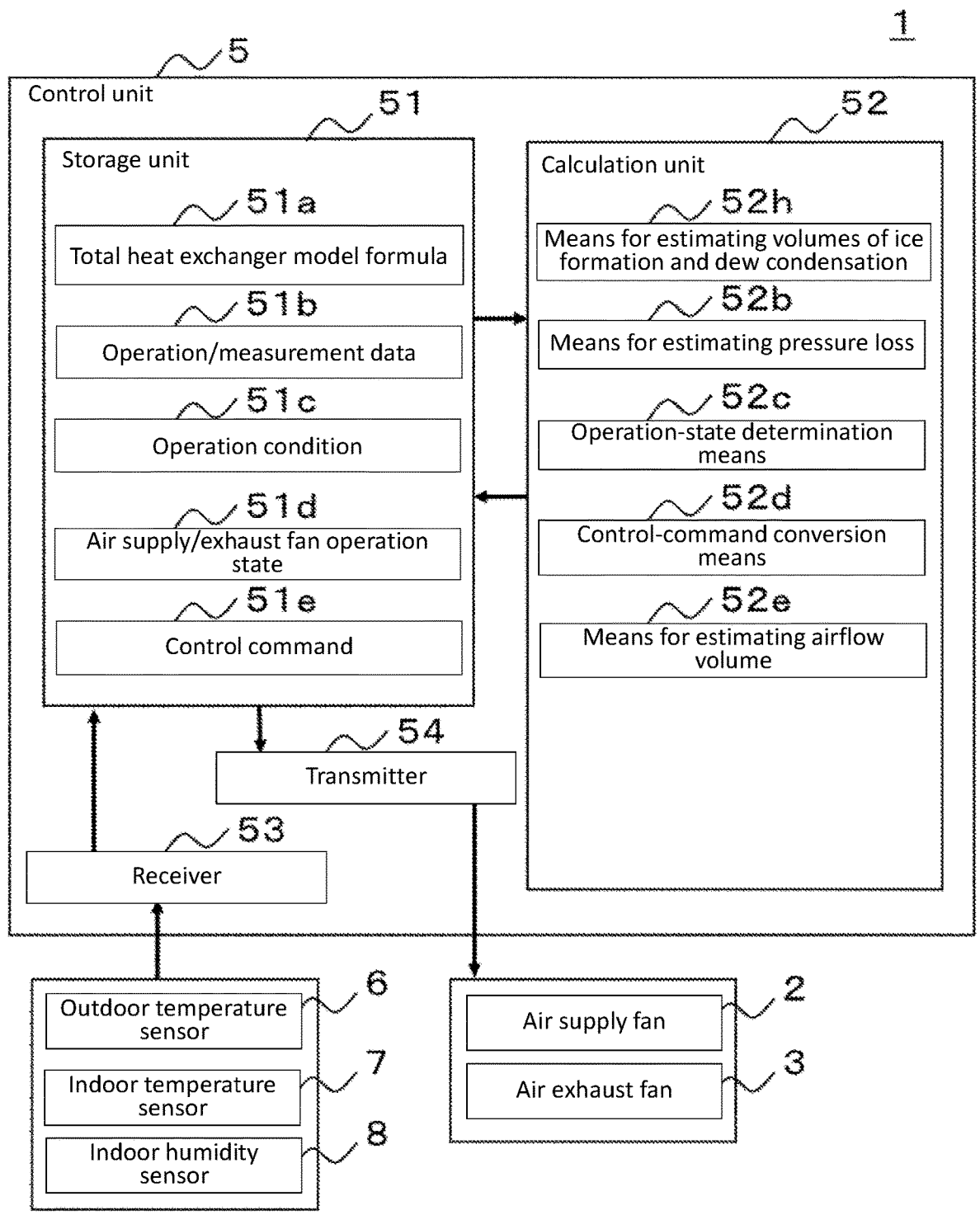
FIG. 15 is a system configuration diagram example showing the control unit of the ventilator according to Embodiment 2 of the present invention.

FIG. 14 and FIG. 15 are each an example of a functional configuration diagram of a control unit 5 of a ventilator 1 according to Embodiment 2 of the present invention. In the figures, the components given the same symbols are the same or equivalent component, which is common to all the sentences in this specification and to all the drawings. Furthermore, all the components described in the specification are just examples, and the scopes of the components are not limited to those descriptions.

The difference from Embodiment 1 is that the calculation unit 52 includes a means 52e for estimating airflow volume and the operation-state determination means 52c determines operation states in a different way. Thus, detailed descriptions of the functions and operations that do not differ from those in Embodiment 1 will be omitted.

The ventilator 1 includes the air supply fan 2, the air exhaust fan 3, the total heat exchanger 4, the control unit 5, the outdoor temperature sensor 6, the indoor temperature sensor 7, and the indoor humidity sensor 8. The control unit 5 includes the storage unit 51 being a memory or the like, the calculation unit 52 being a processor or the like, the receiver 53, and the transmitter 54. The storage unit 51 stores information such as the total heat exchanger model formula 51a, the operation/measurement data 51b, the ice formation volume $V_{freeze}$, the operation conditions 51c, the air supply/exhaust fan operation states 51d, and the control commands 51e. The calculation unit 52 includes the means 52h for estimating volumes of ice formation and dew condensation (or the means 52a for estimating ice formation volume), the means 52b for estimating pressure loss, the operation-state determination means 52c, the control-command conversion means 52d, and the means 52e for estimating airflow volume.

(Means 52e for Estimating Airflow Volume)

The means 52e for estimating airflow volume calculates the volume of the air passing through the total heat exchanger 4 from the data estimated by the means 52b for estimating pressure loss, and from the operation/measurement data 51b, the operation conditions 51c, and the total heat exchanger model formula 51a of the ventilator 1 that are stored in the storage unit 51.

Figure 16:
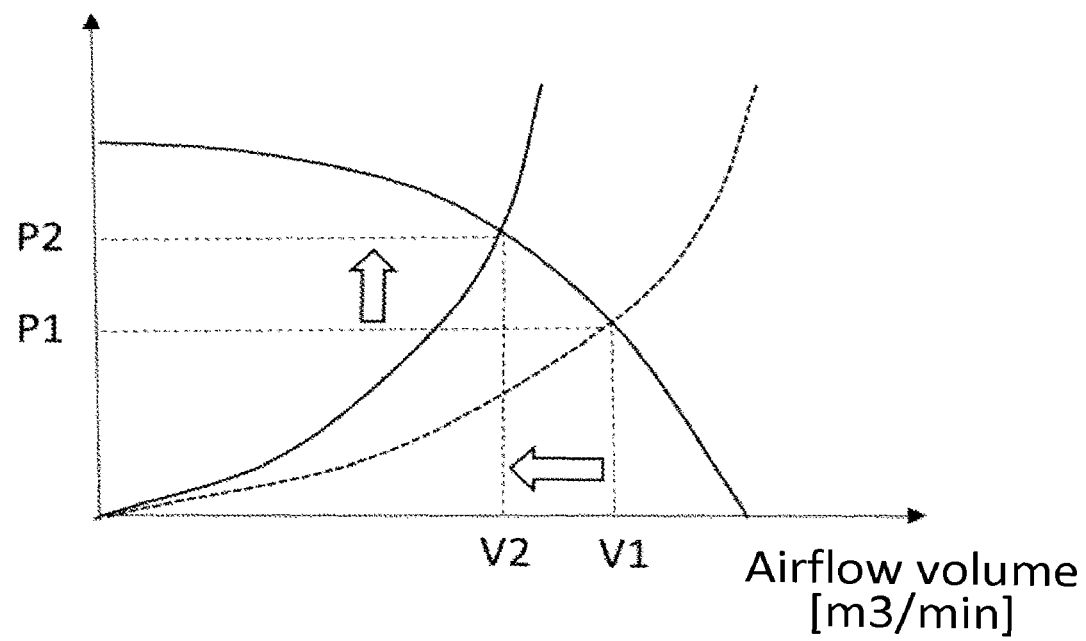
FIG. 16 is a P-Q diagram showing relations between airflow volume and pressure that are expressed by a total heat exchanger model formula of the ventilator according to Embodiment 2 of the present invention.

FIG. 16 is a P-Q diagram example showing relations between airflow volumes and pressures in the ventilator 1. In a state where no ice is formed, and the airflow volume and the pressure are V1 and P1, respectively, the occurrence of ice formation increases a pressure loss ΔP, and causes the pressure to increase to P2, thereby decreasing the airflow volume from V1 to V2. Using these relations, the means 52e for estimating airflow volume calculates the airflow volume passing through the total heat exchanger 4 from the pressure loss ΔP obtained by the means 52b for estimating pressure loss. As described above, if a P-Q diagram of the ventilator 1 is available, the airflow volume and the pressure is represented as a relation of one-to-one. In addition, the storage unit 51 being a memory or the like stores information equivalent to the P-Q diagram which represents the relation between the airflow volume and the pressure in the ventilator 1.

(Operation-State Determination Means 52c)

The operation-state determination means 52c functions in the same manner as in Embodiment 1 in that it determines the air supply/exhaust fan operation states 51d on the basis of the ice formation volume $V_{freeze}$ in the total heat exchanger 4. That is, The air supply/exhaust fan operation states 51d include, for example, the airflow volume, its operation states (including a high power operation and a low power operation), and a stop state. In a case where both the air supply fan 2 and the air exhaust fan 3 are in operation and where the ice formation volume $V_{freeze}$ in the total heat exchanger 4 estimated by the means 52h for estimating volumes of ice formation and dew condensation (or the means 52a for estimating ice formation volume) is zero, the air supply/exhaust fan operation state 51d continues to stay in the same state as that in the previous time.

In Embodiment 1, for example, in a case where the pressure loss ΔP in the total heat exchanger 4 exceeds a predetermined pressure loss threshold, the air supply fan 2 is stopped and only the air exhaust fan 3 is operated, whereby the ice formed in the total heat exchanger 4 is melted by the warm return air coming from the room. In Embodiment 2, instead of the threshold-determination about the pressure loss ΔP, threshold-determination is made about airflow volumes.

In a case where both the air supply fan 2 and the air exhaust fan 3 are in operation and where the airflow volume of the air supply fan 2 in the total heat exchanger 4 falls below a predetermined airflow volume threshold, the air supply fan 2 is stopped and only the air exhaust fan 3 is operated, whereby the ice formed in the total heat exchanger 4 is melted by the warm return air coming from the room.

The duration during which the air supply fan 2 is stopped and only the air exhaust fan 3 is operated is, for example, a time period that starts from the time when it is determined that the air flow volume falls below a predetermined airflow volume threshold and lasts for a period predetermined according to the outdoor air temperature measured by the outdoor temperature sensor 6. For example, in a case where the outdoor air temperature is below −15 degrees C. at the time when it is determined that the airflow volume falls below the threshold, the air supply fan 2 is stopped for 45 minutes; in a case of a range between −15 and −10 degrees C., the air supply fan is stopped for 30 minutes; and in a case of a range between −10 and −5 degrees C., the air supply fan is stopped for 15 minutes. The lower the outdoor air temperature is, the longer the air supply fan 2 is to be kept stopped. The stoppage durations of the air supply fan 2 may be determined in advance by experiments on the basis of the information on the material and structure of the total heat exchanger 4. The stoppage durations of the air supply fan 2 may be determined in advance according to not only the outdoor air temperature but also the indoor temperature and humidity measured by the indoor temperature sensor 7 and the indoor humidity sensor 8.

Or, instead of determining in advance the stoppage durations of the air supply fan 2, its stoppage duration may be determined using the airflow volume. Such operation may be that the ice formation volume $V_{freeze}$ and the airflow volume in the total heat exchanger 4 are successively calculated using the total heat exchanger model formula 51a, the means 52h for estimating volumes of ice formation and dew condensation (or the means 52a for estimating ice formation volume), and the means 52b for estimating pressure loss, and that until the airflow volume becomes the threshold or larger, the air supply fan 2 is kept stopped with only the air exhaust fan 3 operated.

Another operation may be that whether the airflow volume exceeds a threshold is not determined, and that the air supply fan 2 is kept stopped with only the air exhaust fan 3 operated until the ice formation volume $V_{freeze}$ in the total heat exchanger 4 falls below threshold.

When the stoppage duration of the air supply fan 2 expires, the air supply fan 2 is operated again and stays in operation until the ice formation volume $V_{freeze}$ exceeds the threshold.

The means 52h for estimating volumes of ice formation and dew condensation (or the means 52a for estimating ice formation volume) is a component essential to this configuration; if the means 52e for estimating airflow volume can estimate the airflow volume, the means 52b for estimating pressure loss is not an essential component.

(Flowchart)

Figure 17:
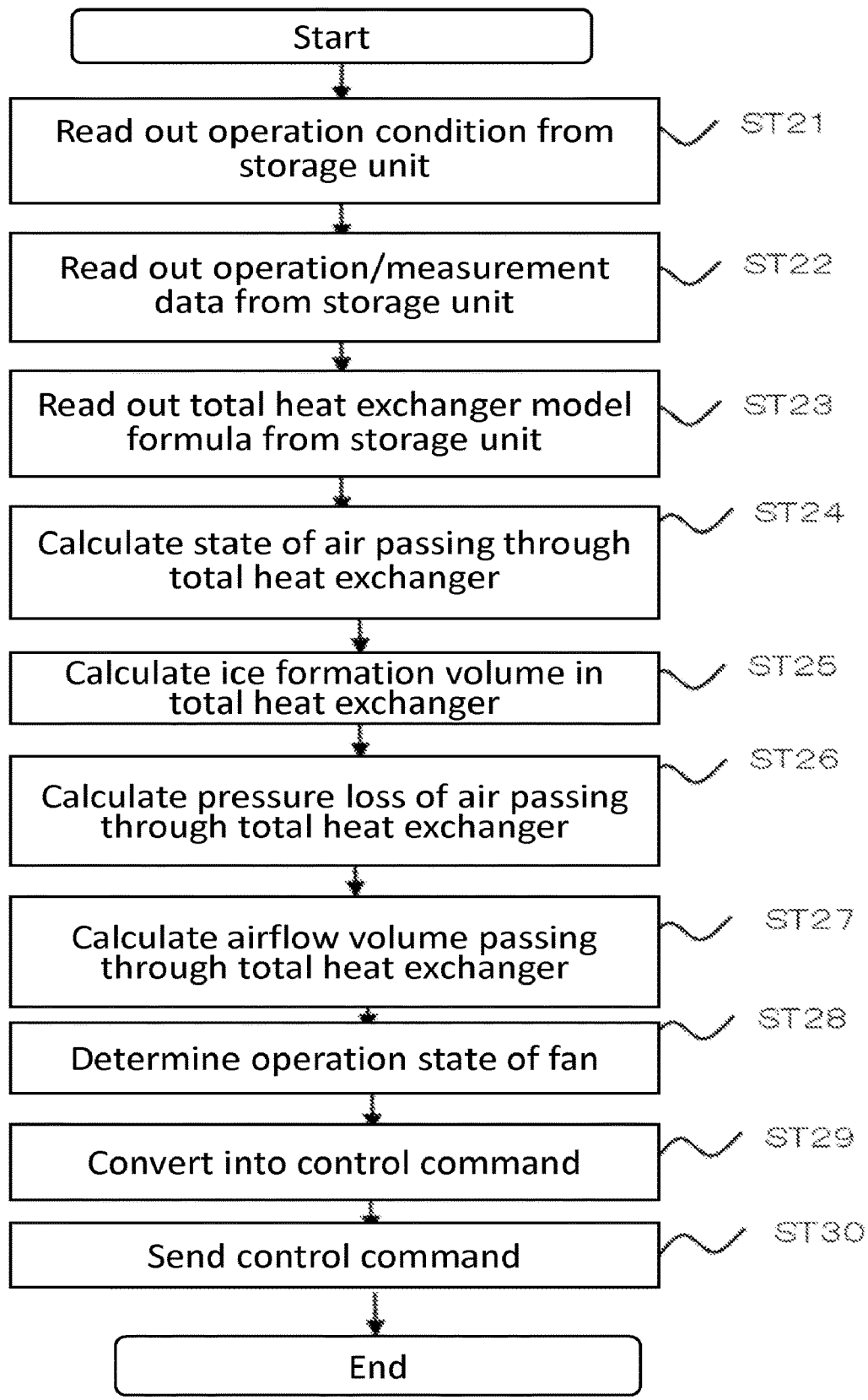
FIG. 17 is a flowchart of the process in the control unit of the ventilator according to Embodiment 2 of the present invention.
Figure 18:
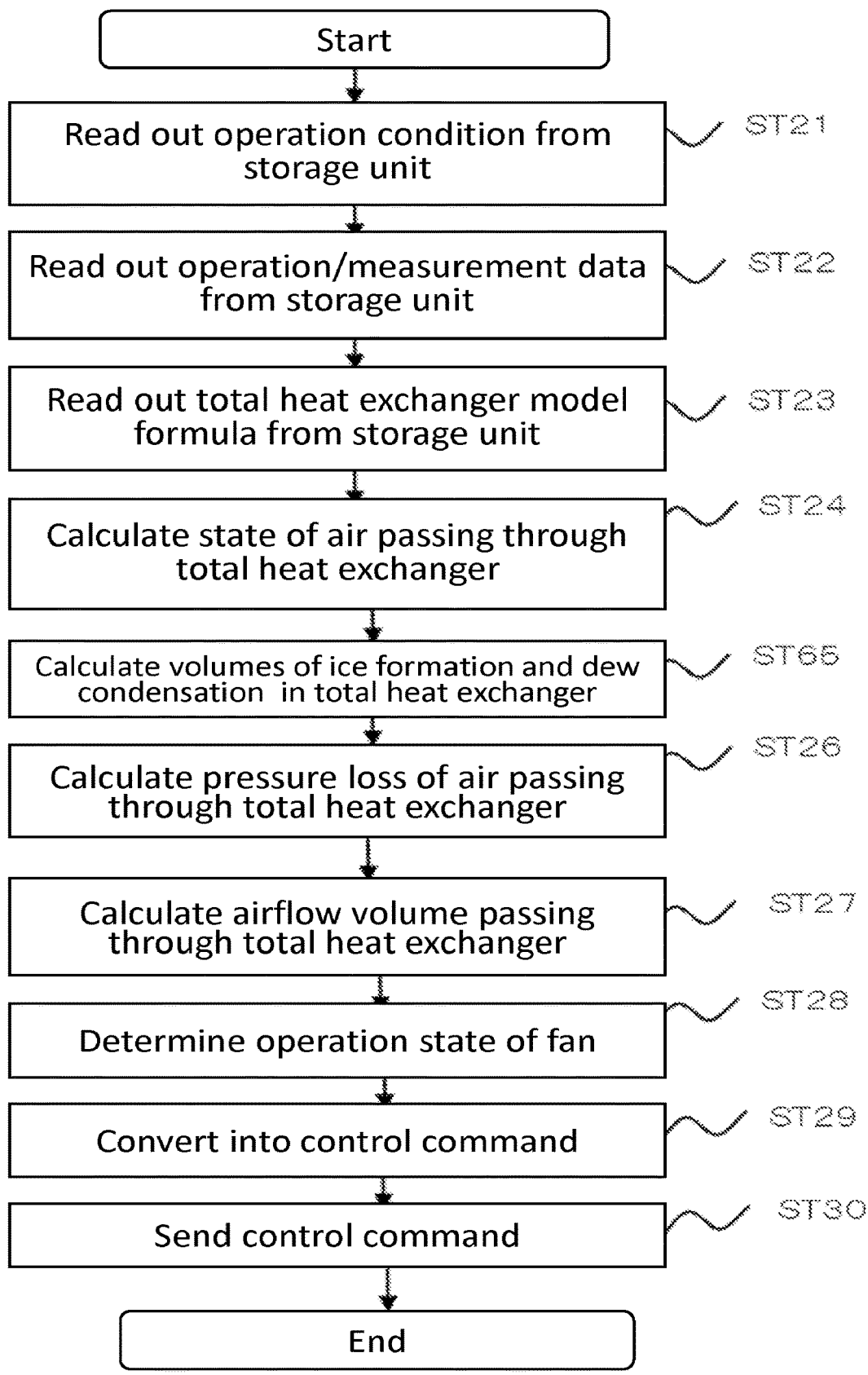
FIG. 18 is a flowchart of the process in the control unit of the ventilator according to Embodiment 2 of the present invention.

FIG. 17 and FIG. 18 are each a flowchart in the process of the control unit 5 of the ventilator 1 according to Embodiment 2. In the process shown in FIG. 17, the means 52a for estimating ice formation volume is used; in the process shown in FIG. 18, the means 52h for estimating volumes of ice formation and dew condensation is used. Because the means 52a is interchangeable with the means 52h, there is no difference therebetween except that, in FIG. 18, step ST25 in FIG. 17 is replaced with step ST65.

These processing flows are performed at predetermined time intervals. For example, a time interval is one minute, ten minutes, thirty minutes, or the like. There is no need to fix the time interval, and the time interval may be changed according to day and night, or seasons (more specifically, months in a year). The time interval is stored in the storage unit 51 as a part of the operation conditions 51c. The processing flow will be described below. Details executed in each step have been described in the description of the function of each means included in the calculation unit 52 of Embodiment 1; therefore, the detailed description will be omitted.

In step ST21, the calculation unit 52 reads out the operation conditions 51c from the storage unit 51. In step ST22, the calculation unit 52 reads out the operation/measurement data 51b of the ventilator 1 from the storage unit 51. In step ST23, the calculation unit 52 reads out the total heat exchanger model formula 51a from the storage unit 51. In step ST24, the means 52h for estimating volumes of ice formation and dew condensation (or the means 52a for estimating ice formation volume) determines the state of the air passing through the total heat exchanger 4 by using the total heat exchanger model formula 51a. In step ST65 (or step ST25), the means 52h for estimating volumes of ice formation and dew condensation (or the means 52a for estimating ice formation volume) calculates the ice formation volume $V_{freeze}$ in the total heat exchanger 4 by using the total heat exchanger model formula 51a.

In step ST26, the means 52b for estimating pressure loss calculates the pressure loss ΔP of the air passing through the total heat exchanger 4 by using the total heat exchanger model formula 51a. In step ST27, the means 52e for estimating airflow volume calculates the volume of the air passing through the total heat exchanger 4 by using the total heat exchanger model formula 51a. If the airflow volume can be calculated without calculating the pressure loss ΔP of the air, it is possible to omit step ST26.

In step ST28, the operation-state determination means 52c determines operation states of the air supply fan 2 and the air exhaust fan 3. In step ST29, the control-command conversion means 52d converts the air supply/exhaust fan operation states 51d into the control commands 51e. In step ST30, the transmitter 54 sends the control commands 51e to the air supply fan 2 and the air exhaust fan 3.

Similarly to Embodiment 1, the ventilator 1 according to Embodiment 2 has an effect that the ice formation volume $V_{freeze}$ in the total heat exchanger 4 is reduced and also has an effect that durations for heat exchanging and ventilation are increased to save energy.

As described above, a ventilator includes: an air supply fan to supply outdoor air to a room; an air exhaust fan to exhaust indoor air, out of the room; a total heat exchanger which is made with partition boards being moisture-permeable flat parts and with spacer boards being corrugated parts, the partition boards and the spacer boards being alternately stacked, the total heat exchanger exchanging heat between the outdoor air and the indoor air; an indoor temperature sensor to measure a temperature of the indoor air; an indoor humidity sensor to measure a humidity of the indoor air; an outdoor temperature sensor to measure a temperature of the outdoor air; and a control unit to control operation of the air supply fan and the air exhaust fan on a basis of at least one state quantity estimated by substituting the indoor air temperature, the indoor air humidity, and the outdoor air temperature in a total heat exchanger model formula representing characteristics of the total heat exchanger.

The total heat exchanger model formula represents how the heat (temperature) and the moisture (humidity) are transferred and exchanged between the outdoor air and the indoor air passing through the total heat exchanger.

Here, the state quantities to be estimated include an ice formation volume, and the estimated state quantities include the volume of the airflow generated by the air supply fan.

When the airflow volume is equal to or less than a threshold, only the air exhaust fan is operated.

When the airflow volume is below a threshold, the stoppage duration of the air supply fan is made longer as the indoor air temperature becomes lower.

Embodiment 3

Figure 19:
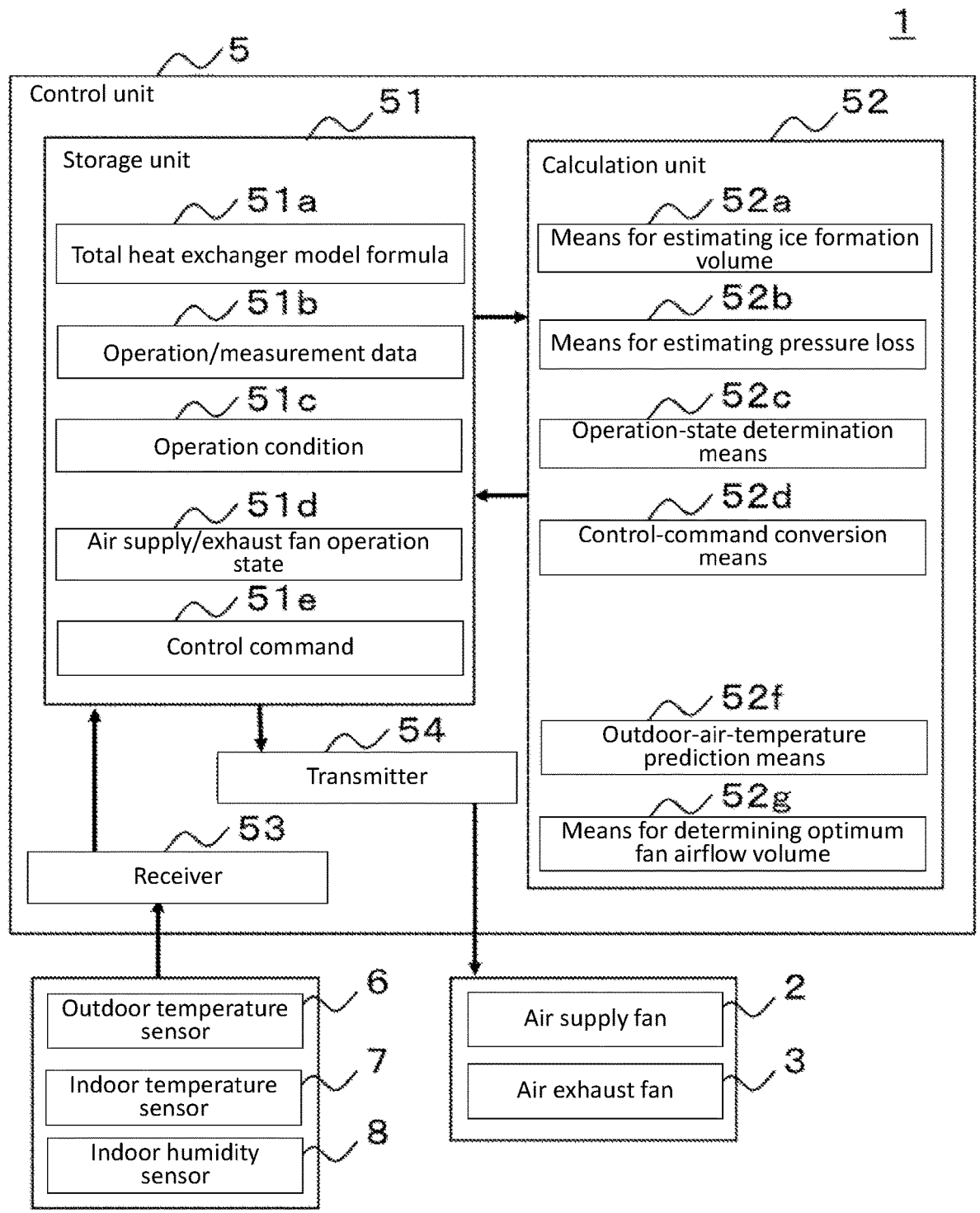
FIG. 19 is a system configuration diagram example showing a control unit of the ventilator according to Embodiment 3 of the present invention.
Figure 20:
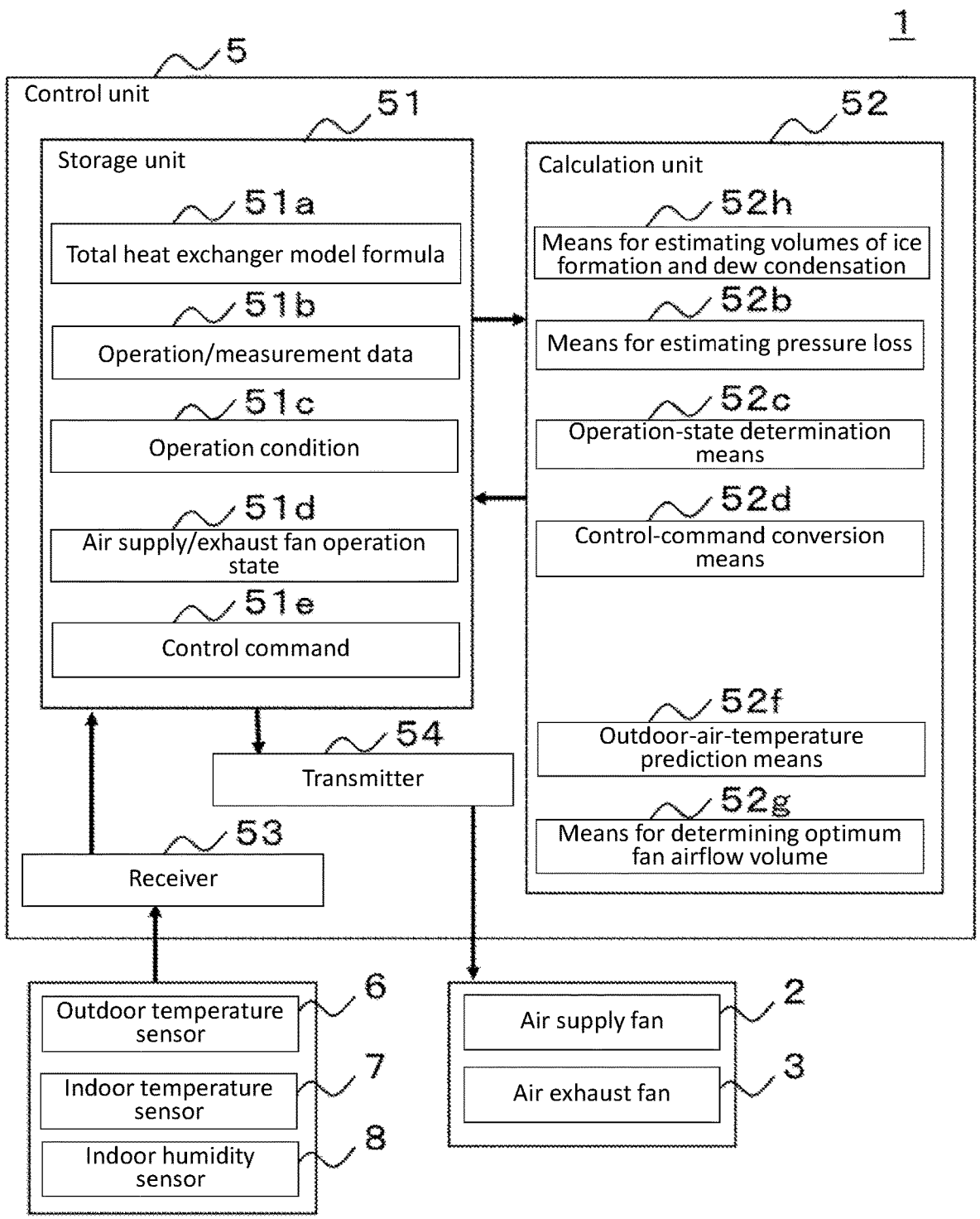
FIG. 20 is a system configuration diagram example showing the control unit of the ventilator according to Embodiment 3 of the present invention.

FIG. 19 and FIG. 20 each are a functional configuration diagram example showing a control unit 5 of a ventilator according to Embodiment 3 of the present invention. The difference from Embodiment 1 is that the calculation unit 52 includes an outdoor-air-temperature prediction means 52f and a means 52g for determining optimum fan-airflow volume. Thus, detailed description of the functions and operations that do not differ from those in Embodiment 1 will be omitted.

The ventilator 1 includes the air supply fan 2, the air exhaust fan 3, the total heat exchanger 4, the control unit 5, the outdoor temperature sensor 6, the indoor temperature sensor 7, and the indoor humidity sensor 8. The control unit 5 includes the storage unit 51 being a memory or the like, the calculation unit 52 being a processor or the like, the receiver 53, and the transmitter 54. The storage unit 51 stores information such as the total heat exchanger model formula 51a, the operation/measurement data 51b, the ice formation volume $V_{freeze}$, the operation conditions 51c, the air supply/exhaust fan operation states 51d, and the control commands 51e. The calculation unit 52 includes the means 52h for estimating volumes of ice formation and dew condensation (or the means 52a for estimating ice formation volume), the means 52b for estimating pressure loss, the operation-state determination means 52c, the control-command conversion means 52d, the outdoor-air-temperature prediction means 52f, and the means 52g for determining optimum fan-airflow volume.

(Outdoor-Air-Temperature Prediction Means 52f)

The outdoor-air-temperature prediction means 52f predicts a future outdoor air temperature transitioning from the past measurement values of the outdoor temperature sensor 6 stored in the storage unit 51. An example of its prediction technique is that a coefficient vector {φ0, φ1, ..., φp} of a time series model such as expressed in Formula (30) is estimated from the transition of past outdoor air temperatures to thereby predict the outdoor air temperature at a time of t, from past outdoor air temperatures at past times of (t−⁻1) to (t−⁻p). Here, εt is white noise.

[Formula 30]

$$Y_t = \varphi 0 + \varphi 1 Y_{t-1} + \varphi 2 Y_{t-2} + \ldots + \varphi p Y_{t-p} + \varepsilon t \quad (30)$$

The example shown in Formula (30) is an autoregressive model. Another model may be applicable in which not only the past outdoor air temperature data but also, for example, the maximum temperature of the day before, the lowest temperature thereof, and the solar radiation amount transition thereof are used. Furthermore, the model may use an outdoor air temperature of the day before, or a typical outside air temperature stored in advance.

(Means 52g for Determining Optimum Fan-Airflow Volume)

The means 52g for determining optimum fan-airflow volume determines the air supply/exhaust fan operation states 51d using the outdoor air temperature predicted by the outdoor-air-temperature prediction means 52f and using the total heat exchanger model formula 51a, so as to minimize the ventilation load within a range in which the pressure loss does not exceed its threshold.

The optimization problem is formulated, for example, as those shown in Expression (31) and Constraints (32). Expression (31) shows an objective function, and Constraints (32) are constraints grouped for Expression (31). $V_{EA}(t)$ and $V_{SA}(t)$ are control variables. The way to solve the problem of Expression (31) is not limited. Ventilation airflow volumes, which are control variables, may be continuous or discrete.

[Expression 31]

$$\min \sum_{t=T}^{k} Q_{vent}(t) \quad (31)$$

[Constraints 32]

Constraint formula (32)

$Q_{vent}(t) = (h_{RA}(t) - h_{OA}(t)) \times V_{vent}(t) \times \theta(t)$
$P(t) \leq P_{max}$
$0 \leq V_{vent}(t) \leq V_{max}$
$\theta(t) = f(h_{RA}(t), h_{OA}(t), h_{SA}(t))$
$h_{SA}(t) = f(T_{SA}(t), X_{SA}(t))$
$T_{SA}(t), X_{SA}(t) = f(M_{ice}(t))$
$P(t) = f(M_{ice}(t))$
$V_{vent}(t) = V_{SA}(t)$ When $V_{SA}(t) = V_{EA}(t)$
$V_{vent}(t) = V_{EA}(t)$ When $V_{SA}(t) = 0$ -continued Control variables $V_{EA}(t), V_{SA}(t)$ Here, the above symbols are: $Q_{vent}$: ventilation load; $\Delta P$: pressure loss; $P_{max}$: pressure loss threshold; $V_{vent}$: ventilation airflow volume; $V_{max}$: maximum ventilation airflow volume (rated airflow volume); $h_{RA}$: enthalpy of return air from the room; $h_{OA}$: outdoor air enthalpy; $\theta$: total heat exchange efficiency; $V_{EA}$: exhaust fan airflow volume; $V_{SA}$: air supply fan airflow volume; and k: time to determine ventilation airflow volume.

The ventilation load $Q_{vent}$ is heat load by the ventilation, which is part of the heat load to be treated by an air conditioner installed in the room. The ventilation load increase causes an increase of the heat load to be treated by the air conditioner, whereby energy consumption of the air conditioner is increased. As shown in Constraint (32) being a constraint formula of Expression (31), the ventilation load $Q_{vent}$ depends on the ventilation airflow volume $V_{vent}$ and the total heat exchange efficiency $\theta$. When the airflow volumes are equal between the air supply fan 2 and the air exhaust fan 3, the ventilation airflow volume Vent is the equal airflow volume; when they are not, the ventilation airflow volume is the airflow volume of the air exhaust fan 3. This is because, in a case where the air supply fan 2 is out of operation and only the air exhaust fan 3 is in operation, there is no air supply through the ventilator 1 but the air exhaust makes the room in a negative pressure, which leads to a supposition that the outdoor air enters, by the volume of the air exhausted, through cracks or openings and from the outside.

The total heat exchange efficiency $\theta$ is calculated by Formula (34). A symbol of $h_{SA}$ is supply air enthalpy. The total heat exchange efficiency $\theta$ changes with the supply air enthalpy $h_{SA}$, and $h_{SA}$ can be calculated from $T_a$ and $X_a$ at the exit of the air supply side element which are obtained by Formulas (4) and (9). For example, the supply air enthalpy can be calculated from Formula (33). Therefore, in a case where ice formation occurs, $h_{SA}$ changes according not only to the material and structure of the total heat exchanger 4, but also to the ice formation volume $V_{freeze}$. Because the value of $h_{SA}$ changes from moment to moment, the calculation of $h_{SA}$ is repeatedly made by using the ice formation model in a case where the ice formation occurs, and by using the ice melting model in a case where the air supply fan 2 is out of operation. In addition, the total heat exchange efficiency $\theta$ is zero when the air supply fan 2 is out of operation.

[Formula 33]

$$h_{SA} = 0.240\ T_{SA} + (0.431\ T_{SA} + 597.3)X_{SA} \quad (33)$$

[Formula 34]

$$\theta = \frac{h_{OA} - h_{SA}}{h_{OA} - h_{RA}} \quad (34)$$

By solving Expression (31) and Constraint (32), air supply fan airflow volumes and exhaust fan airflow volumes for k time-steps can be obtained, so that the ventilation load for the time periods can be suppressed in a range in which the pressure loss does not exceed its threshold. By providing the calculation unit 52 with the means 52g for determining optimum fan-airflow volume, the operation-state determination means 52c dynamically determines the air supply/exhaust fan operation states 51d in a range in which the pressure loss does not exceed its threshold.

(Flowchart)

Figure 21:
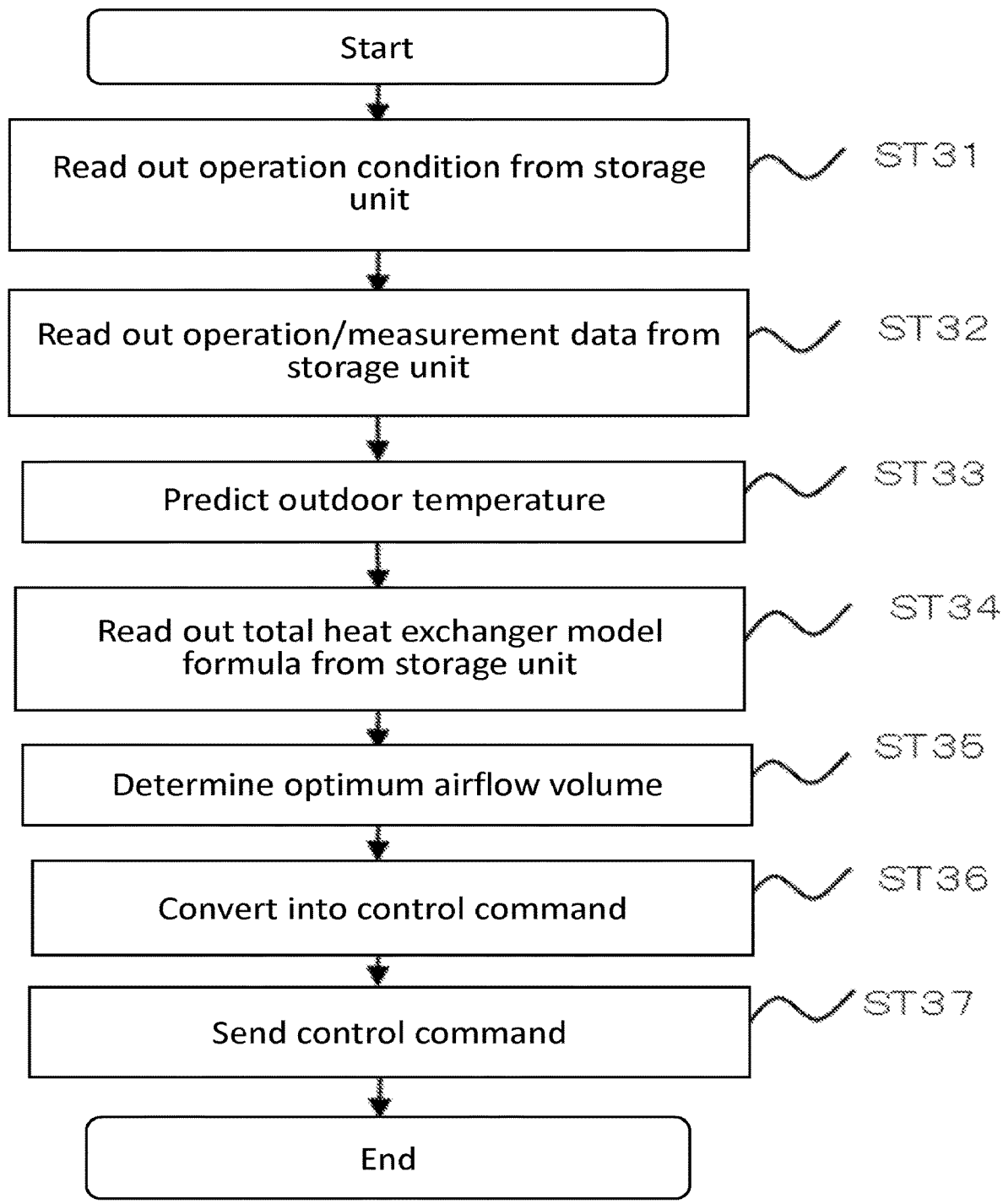
FIG. 21 is a flowchart of the process in the control unit of the ventilator according to Embodiment 3 of the present invention.

FIG. 21 is a flowchart showing the process of the control unit 5 of the ventilator 1 according to Embodiment 3. These processing flows are performed at predetermined time intervals. For example, a time interval is one minute, ten minutes, thirty minutes, or the like. There is no need to fix the time interval, and the time interval may be changed according to day and night, or seasons (more specifically, months in a year). The time interval is stored in the storage unit 51 as a part of the operation conditions 51c. The processing flow will be described below. Details executed in each step have been described in the description of the function of each means included in the calculation unit 52 of Embodiment 1; therefore, the detailed description will be omitted.

In step ST31, the calculation unit 52 reads out the operation conditions 51c from the storage unit 51. In step ST32, the calculation unit 52 reads out the operation/measurement data 51b of the ventilator 1 from the storage unit 51.

In step ST33, the outdoor-air-temperature prediction means 52f predicts the outdoor air temperature. In step ST34, the operation-state determination means 52c reads out the total heat exchanger model formula 51a from the storage unit 51.

In step ST35, the means 52g for determining optimum fan-airflow volume determines the optimum fan-airflow volume. In step ST36, the control-command conversion means 52d converts the operation states into the control commands 51e. In step ST37, the transmitter 54 sends the control commands 51e to the air supply fan 2 and the air exhaust fan 3.

It becomes possible to optimize the operation states of the ventilator 1, which can realize energy saving.

As described above, a ventilator includes: an air supply fan to supply outdoor air to a room; an air exhaust fan to exhaust indoor air, out of the room; a total heat exchanger which is made with partition boards being moisture-permeable flat parts and with spacer boards being corrugated parts, the partition boards and the spacer boards being alternately stacked, the total heat exchanger exchanging heat between the outdoor air and the indoor air; an indoor temperature sensor to measure a temperature of the indoor air; an indoor humidity sensor to measure a humidity of the indoor air; an outdoor temperature sensor to measure a temperature of the outdoor air; and a control unit to control operation of the air supply fan and the air exhaust fan on a basis of at least one state quantity estimated by substituting the indoor air temperature, the indoor air humidity, and the outdoor air temperature in a total heat exchanger model formula representing characteristics of the total heat exchanger.

The total heat exchanger model formula represents how the heat (temperature) and the moisture (humidity) to be exchanged between the outdoor air and the indoor air passing through the total heat exchanger are transferred.

Here, the state quantities to be estimated include an ice formation volume, and the estimated state quantities also include a pressure loss of the airflow generated by the air supply fan.

The control unit includes the outdoor-air-temperature prediction means to predict a future outdoor air temperature and uses the predicted outdoor air temperature to minimize the ventilation load in an operation range in which the pressure loss does not exceed its threshold.

Embodiment 4

Figure 22:
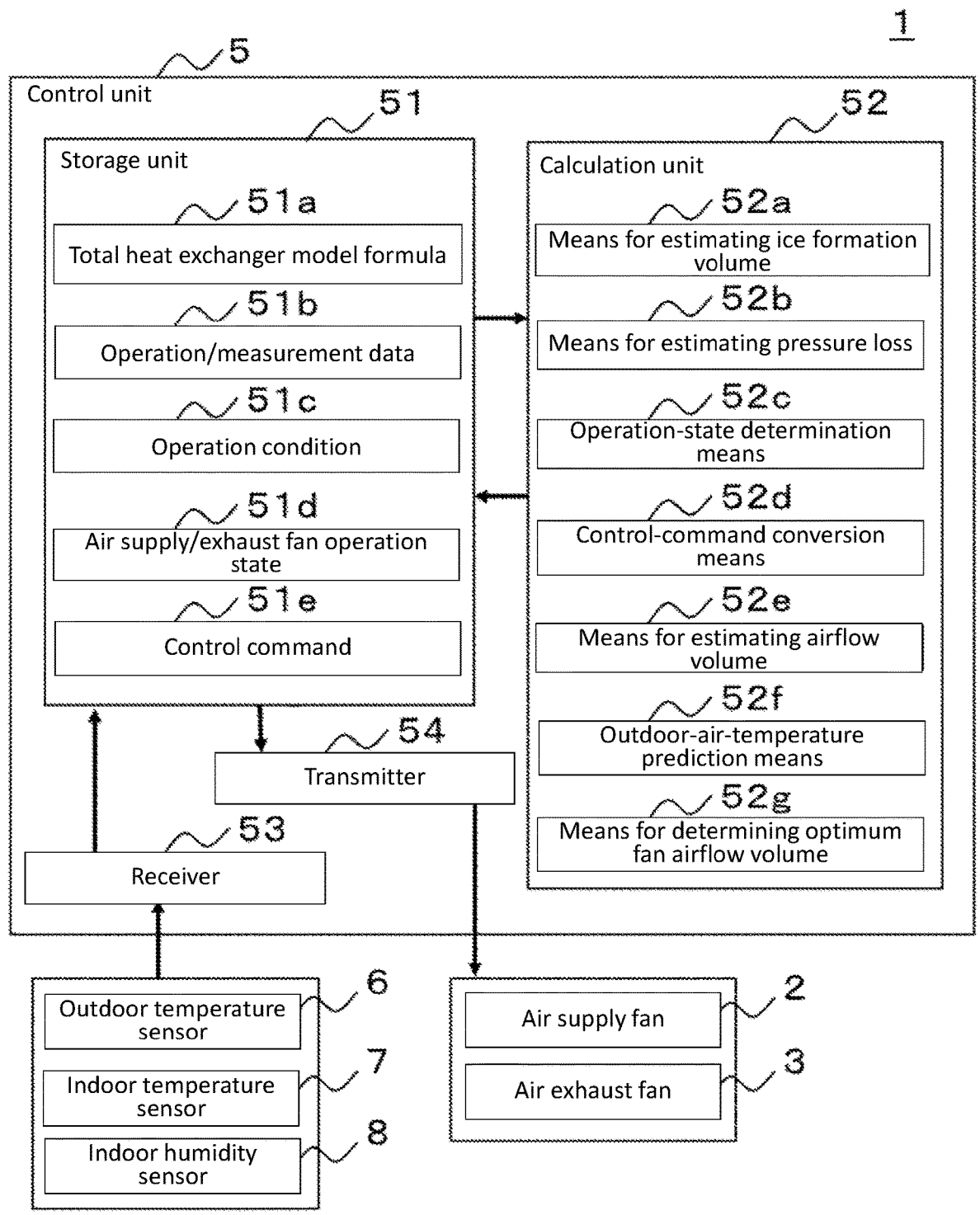
FIG. 22 is a system configuration diagram example showing a control unit of a ventilator according to Embodiment 4 of the present invention.
Figure 23:
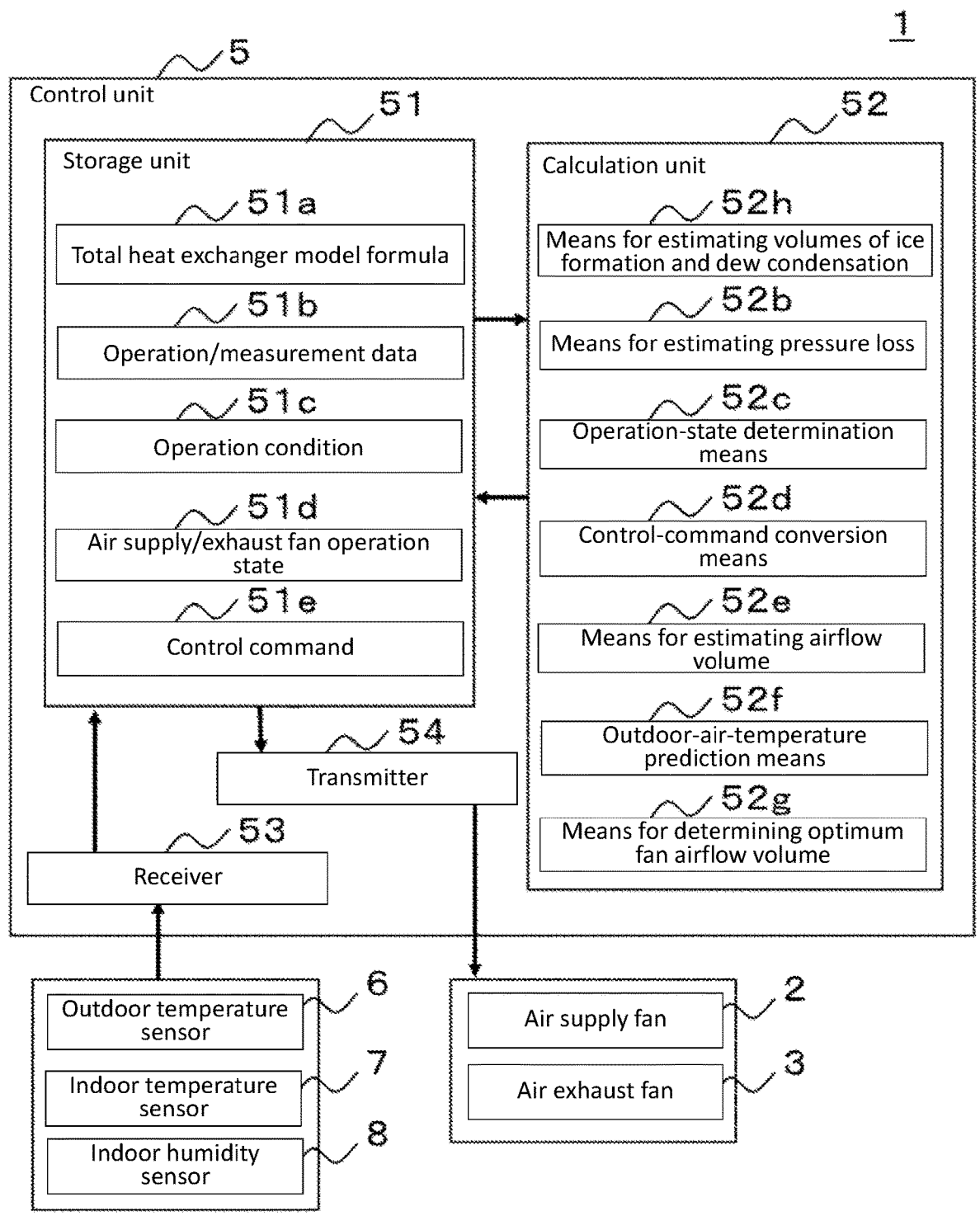
FIG. 23 is a system configuration diagram example showing a control unit of the ventilator according to Embodiment 4 of the present invention.

FIG. 22 and FIG. 23 are each a functional configuration example of a control unit 5 of a ventilator 1 according to Embodiment 4 of the present invention. The difference from Embodiment 3 is that the means 52e for estimating airflow volume is provided as in Embodiment 2. Thus, detailed description of the functions and operations that do not differ from those in Embodiment 1, Embodiment 2, and Embodiment 3 will be omitted.

The ventilator 1 includes the air supply fan 2, the air exhaust fan 3, the total heat exchanger 4, the control unit 5, the outdoor temperature sensor 6, the indoor temperature sensor 7, and the indoor humidity sensor 8. The control unit 5 includes the storage unit 51 being a memory or the like, the calculation unit 52 being a processor or the like, the receiver 53, and the transmitter 54. The storage unit 51 stores information such as the total heat exchanger model formula 51a, the operation/measurement data 51b, the ice formation volume $V_{freeze}$, the operation conditions 51c, the air supply/exhaust fan operation states 51d, and the control commands 51e. The calculation unit 52 includes the means 52h for estimating volumes of ice formation and dew condensation (or the means 52a for estimating ice formation volume), the means 52b for estimating pressure loss, the operation-state determination means 52c, the control-command conversion means 52d, the means 52e for estimating airflow volume, the outdoor-air-temperature prediction means 52f, and the means 52g for determining optimum fan-airflow volume. In addition, the storage unit 51 being a memory or the like stores information equivalent to the P-Q diagram which represents the relation between the airflow volume and the pressure in the ventilator 1.

(Means 52g for Determining Optimum Fan-Airflow Volume)

The means 52g for determining optimum fan-airflow volume according to Embodiment 4 determines the air supply/exhaust fan operation states 51d using the outdoor air temperature predicted by the outdoor-air-temperature prediction means 52f and using the total heat exchanger model formula 51a, so as to minimize the ventilation load in an operation range in which the airflow volume is in an operation range below the airflow threshold.

A formularization example for the optimization problem is shown in Expression (35) and Constraint (36). Expression (35) is an objective function, and Constraints (36) are constraints grouped for Expression (35). $V_{EA}(t)$ and $V_{SA}(t)$ are control variables. Any means capable of solving the problem formulated by Expression (35) can be used. The ventilation airflow volume being a control variable may be a continuous value or a discrete value.

[Expression 35]

$$\min \sum_{t=T}^{k} Q_{vent}(t) \tag{35}$$

-continued

[Constraint 36]

$$Q_{vent}(t) = (h_{RA}(t) - h_{OA}(t)) \times V_{vent}(t) \times \theta(t) \quad (36)$$
$$V_{min} \leq V_{ice}(t)$$
$$0 \leq V_{vent}(t) \leq V_{max}$$
$$\theta(t) = f(h_{RA}(t), h_{OA}(t), h_{SA}(t))$$
$$h_{SA}(t) = f(T_{SA}(t), X_{SA}(t))$$
$$T_{SA}(t), X_{SA}(t) = f(M_{ice}(t))$$
$$\Delta P(t) = f(M_{ice}(t))$$
$$V_{vent}(t) = V_{SA}(t) \text{ at} V_{SA}(t) = V_{EA}(t)$$
$$V_{vent}(t) = V_{EA}(t) \text{ at} V_{SA}(t) = 0$$

Here, the above symbols are: $V_{ice}$: airflow volume when ice formation occurs; and $V_{min}$: airflow volume threshold when ice formation occurs.

(Flowchart)

Description of the flowcharts are omitted because they are the same as in Embodiment 3.

Similarly to the advantage obtained in Embodiment 3, it becomes possible to optimize the operation states of the ventilator 1, which can realize energy saving.

As described above, a ventilator includes: an air supply fan to supply outdoor air to a room; an air exhaust fan to exhaust indoor air, out of the room; a total heat exchanger which is made with partition boards being moisture-permeable flat parts and with spacer boards being corrugated parts, the partition boards and the spacer boards being alternately stacked, the total heat exchanger exchanging heat between the outdoor air and the indoor air; an indoor temperature sensor to measure a temperature of the indoor air; an indoor humidity sensor to measure a humidity of the indoor air; an outdoor temperature sensor to measure a temperature of the outdoor air; and a control unit to control operation of the air supply fan and the air exhaust fan on a basis of at least one state quantity estimated by substituting the indoor air temperature, the indoor air humidity, and the outdoor air temperature in a total heat exchanger model formula representing characteristics of the total heat exchanger.

The total heat exchanger model formula represents how the heat (temperature) and the moisture (humidity) to be exchanged between the outdoor air and the indoor air passing through the total heat exchanger are transferred.

Here, the state quantities to be estimated include an ice formation volume, and the estimated state quantities also include an airflow volume generated by the air supply fan.

The control unit includes the outdoor-air-temperature prediction means to predict a future outdoor air temperature and uses the predicted outdoor air temperature to minimize the ventilation load in an operation range in which the airflow volume generated by the air supply fan does not fall below a threshold.

Embodiments described so far do not limit the scope of the present invention, and various changes and modifications can be made within the scope of the present invention. That is, the configurations of the embodiments so far described may be suitably improved; some components of the configuration may at least be replaced with other ones. Furthermore, if the arrangement of a component is not specified, the component can be arranged not only at the positions disclosed in the embodiments but also at a position where the component can fully function. The plurality of components described so far in the embodiments may be suitably combined into an invention. Moreover, the scope of the present invention is defined not only by the embodiments so far described but also by claims of the invention; and the scope of the present invention includes all changes that are made within the claims and within the meaning of their equivalents and the scope thereof.

Description of Symbols

1: ventilator
2: air supply fan,
3: air exhaust fan,
4: total heat exchanger,
5: control unit,
6: outdoor temperature sensor,
7: indoor temperature sensor,
8: indoor humidity sensor,
41: partition board,
42: spacer board,
51: storage unit,
51a: total heat exchanger model formula,
51b: operation/measurement data,
51c: operation conditions,
51d: air supply/exhaust fan operation states,
51e: control command,
52: calculation unit,
52a: means for estimating ice formation volume,
52b: means for estimating pressure loss,
52c: operation-state determination means,
52d: control-command conversion means,
52e: means for estimating airflow volume,
52f: outdoor-air-temperature prediction means,
52g: means for determining optimum fan-airflow volume,
52h: means for estimating volumes of ice formation and dew condensation,
53: receiver,
54: transmitter.

The invention claimed is:

1. A ventilator comprising:
an air supply fan to supply outdoor air to a room;
an air exhaust fan to exhaust indoor air, out of the room;
a total heat exchanger which is made with partition boards being moisture-permeable flat parts and with spacer boards being corrugated parts, the partition boards and the spacer boards being alternately stacked, the total heat exchanger exchanging heat between the outdoor air and the indoor air, and transferring moisture between supply air and exhaust air;
an indoor temperature sensor to measure a temperature of the indoor air;
an indoor humidity sensor to measure a humidity of the indoor air;
an outdoor temperature sensor to measure a temperature of the outdoor air; and
controlling circuitry to control operation of the air supply fan and the air exhaust fan on a basis of at least one state quantity estimated for each lattice of a plurality of lattices of the total heat exchanger by substituting the indoor air temperature, the indoor air humidity, and the outdoor air temperature in a total heat exchanger model formula representing how heat and moisture to be exchanged between the outdoor air and the indoor air passing through the total heat exchanger are transferred,
wherein the at least one estimated state quantity includes at least one of a dew condensation volume and an ice formation volume.

2. The ventilator according to claim 1, wherein the at least one estimated state quantity includes a pressure loss of an airflow by the air supply fan.

3. The ventilator according to claim 2, wherein in a case where the pressure loss exceeds a threshold, only the air exhaust fan operates.

4. The ventilator according to claim 2, wherein in a case where the pressure loss exceeds a threshold, the lower the indoor air temperature is, the longer in time the air supply fan stops.

5. The ventilator according to claim 1, wherein the at least one estimated state quantity includes a volume of the airflow by the air supply fan.

6. The ventilator according to claim 5, wherein in a case where the airflow volume is equal to or less than a threshold, only the air exhaust fan operates.

7. The ventilator according to claim 6, wherein in a case where the airflow volume is below a threshold, the lower the indoor air temperature is, the longer in time the air supply fan stops.

8. The ventilator according to claim 1, wherein the controlling circuitry includes outdoor-air-temperature prediction circuitry to predict a future outdoor air temperature and uses the predicted outdoor air temperature to minimize a ventilation load within an operation range in which a pressure loss does not exceed a threshold.

9. The ventilator according to claim 1, wherein the controlling circuitry includes outdoor-air-temperature prediction circuitry to predict a future outdoor air temperature and uses the predicted outdoor air temperature to minimize a ventilation load within an operation range in which an airflow volume by the air supply fan does not fall below a threshold.

10. A ventilator comprising:
an air supply fan to supply outdoor air to a room;
an air exhaust fan to exhaust indoor air, out of the room;
a total heat exchanger which is made with partition boards being moisture-permeable flat parts and with spacer boards being corrugated parts, the partition boards and the spacer boards being alternately stacked, the total heat exchanger exchanging heat between the outdoor air and the indoor air, and transferring moisture between supply air and exhaust air;
an indoor temperature sensor to measure a temperature of the indoor air;
an indoor humidity sensor to measure a humidity of the indoor air;
an outdoor temperature sensor to measure a temperature of the outdoor air; and
controlling circuitry to control operation of the air supply fan and the air exhaust fan on a basis of at least one state quantity estimated by substituting the indoor air temperature, the indoor air humidity, and the outdoor air temperature in a total heat exchanger model formula representing how heat and moisture to be exchanged between the outdoor air and the indoor air passing through the total heat exchanger are transferred,
wherein the at least one estimated state quantity includes a pressure loss of an airflow by the air supply fan.

11. The ventilator according to claim 10, wherein in a case where the pressure loss exceeds a threshold, only the air exhaust fan operates.

12. The ventilator according to claim 10, wherein in a case where the pressure loss exceeds a threshold, the lower the indoor air temperature is, the longer in time the air supply fan stops.

13. The ventilator according to claim 10,
wherein the controlling circuitry includes outdoor-air-temperature prediction circuitry to predict a future outdoor air temperature and uses the predicted outdoor air temperature to minimize a ventilation load within an operation range in which a pressure loss does not exceed a threshold.

14. The ventilator according to claim 10,
wherein the controlling circuitry includes outdoor-air-temperature prediction circuitry to predict a future outdoor air temperature and uses the predicted outdoor air temperature to minimize a ventilation load within an operation range in which an airflow volume by the air supply fan does not fall below a threshold.

15. A ventilator comprising:
an air supply fan to supply outdoor air to a room;
an air exhaust fan to exhaust indoor air, out of the room;
a total heat exchanger which is made with partition boards being moisture-permeable flat parts and with spacer boards being corrugated parts, the partition boards and the spacer boards being alternately stacked, the total heat exchanger exchanging heat between the outdoor air and the indoor air, and transferring moisture between supply air and exhaust air;
an indoor temperature sensor to measure a temperature of the indoor air;
an indoor humidity sensor to measure a humidity of the indoor air;
an outdoor temperature sensor to measure a temperature of the outdoor air; and
controlling circuitry to control operation of the air supply fan and the air exhaust fan on a basis of at least one state quantity estimated by substituting the indoor air temperature, the indoor air humidity, and the outdoor air temperature in a total heat exchanger model formula representing how heat and moisture to be exchanged between the outdoor air and the indoor air passing through the total heat exchanger are transferred,
wherein the at least one estimated state quantity includes a volume of the airflow by the air supply fan.

16. The ventilator according to claim 15, wherein in a case where the airflow volume is equal to or less than a threshold, only the air exhaust fan operates.

17. The ventilator according to claim 16, wherein in a case where the airflow volume is below a threshold, the lower the indoor air temperature is, the longer in time the air supply fan stops.

* * * * *